United States Patent [19]
Claydon et al.

[11] Patent Number: 5,724,396
[45] Date of Patent: Mar. 3, 1998

[54] SIGNAL PROCESSING SYSTEM

[75] Inventors: Anthony Peter J. Claydon, Bath; Richard J. Gammack, Bristol, both of United Kingdom

[73] Assignee: Discovision Associates, Irvine, Calif.

[21] Appl. No.: 480,976

[22] Filed: Jun. 7, 1995

[30] Foreign Application Priority Data

Jun. 7, 1995 [GB] United Kingdom .............. 9511551

[51] Int. Cl.$^6$ ........................................ H04L 7/00
[52] U.S. Cl. ........................................ 375/355
[58] Field of Search ........................ 375/355, 360, 375/371, 377, 342, 326, 327; 364/724.1

[56] References Cited

U.S. PATENT DOCUMENTS

| | | | |
|---|---|---|---|
| 5,077,755 | 12/1991 | Kaku et al. | 375/355 |
| 5,087,975 | 2/1992 | Citta et al. | 358/133 |
| 5,168,356 | 12/1992 | Acampora et al. | 358/133 |
| 5,214,676 | 5/1993 | Wilkinson | 364/724.1 |
| 5,287,182 | 2/1994 | Haskell et al. | 348/500 |
| 5,294,894 | 3/1994 | Gebara | 331/1 A |
| 5,304,953 | 4/1994 | Heim et al. | 331/1 A |
| 5,309,484 | 5/1994 | McLane et al. | 375/354 |
| 5,357,544 | 10/1994 | Hormer et al. | 364/724.1 |
| 5,467,137 | 11/1995 | Zdepski | 348/423 |
| 5,497,152 | 3/1996 | Wilson et al. | 341/61 |
| 5,500,874 | 3/1996 | Terrell | 375/232 |
| 5,506,636 | 4/1996 | Patel et al. | 348/725 |
| 5,568,206 | 10/1996 | Goeckler | 348/726 |
| 5,579,346 | 11/1996 | Kanzaki | 375/344 |

OTHER PUBLICATIONS

Performance Results of a 64/256–QAM CATV Receiver Chip Set; Henry Samueli, Charles P. Reames, Leo Montreuil and William E. Wall.

Bennett C. Wong, and Henry Samueli, *A 200–MHz All–Digital QAM Modulator and Demodulator in 1.2–δm CMOS for Digital Radio Applications*, IEEE Journal of Solid–State Circuits, vol. 26, No. 12, Dec. 1991.

(List continued on next page.)

*Primary Examiner*—Stephen Chin
*Assistant Examiner*—Kevin Kim
*Attorney, Agent, or Firm*—Ronald J. Clark; Robert T. Braun; Arthur S. Bickel

[57] ABSTRACT

A CMOS integrated signal processing system for a sampling receiver includes a timing recovery circuit, wherein an on-chip numerically controlled oscillator is operative at periods T that are initially equal to the nominal baud rate of the signals controls a sinc interpolator receiving samples at the sampling rate. A loop filter is coupled to the sinc interpolator and to the numerically controlled oscillator. The arrangement is capable of handling various symbol rates. The system includes a circuit for carrier recovery having a second on-chip numerically controlled oscillator, a digital derotation circuit responsive to the second numerically controlled oscillator, accepting an in phase component and a quadrature component of the sampled signals. An adaptive phase error estimation circuit is coupled in a feedback loop.

31 Claims, 13 Drawing Sheets

OTHER PUBLICATIONS

Citta, Rich, Ron Lee, Practical Implementation of a 43 Mbit/Sec. (8 Bit/HZ) Digital Modem for Cable Television. NCTA Technical Papers 1993 pp. 271–279, Zenith Electronics Corporation, Glenview, IL 60025.

Meyr.H., Ascheid, G. "Fully Digital Receiver for 100Mbit/S 8–PSK TCM Coded transmission (DIRECS)," Course 577 Advanced Digital Receivers for Mobile Communications: Algorithm, Design Methodology and DSP–Tools, Technologies Cei–Europe Oct 2—5 1995, Italy; Mar. 25—29, 1996, Switzerland.

Robert A. Hawley, Thu–Ji Lin, and Henry Samueli, "A 300 MHZ Digital Double–Sideband to Single–Sideband Converter in 1 δM CMOS," IEEE Journal of Solid–State Circuits, vol. 30, No. 1, Jan 1995.

Samueli, Henry, Charles P. Reames, Leo Montreuil & William E. Wall, "Performance Results of a 64/256–QAM CATV Receiver Chip Set," Broadcom Corp., Los Angeles, CA & Scientific–Atlanta Inc., Norcross, GA.

ETS: European Telecommunication Standard 300 421. Dec. 1994.

Gardner, Floyd M. "A BPSK/QPSK Timing–Error Detector for Sampled Receivers," IEEE Transactions on Communicaitons vol. 34, No. 5, May 1986, pp. 423—429.

Pellon, Leopold E. "A Double Nyqist Digital Product Detector for Quadrature Sampling." IEEE Transactions on Signal Processing 40, No. 7 Jul. 1992, pp. 1—11.

SUMMATION OF ALL SINC PULSES

SIGNAL PROCESSING SYSTEM

BACKGROUND OF THE INVENTION

1. Field of the Invention

This invention relates to processing signals received from a communications channel. More particularly this invention relates to an integrated signal processing system for demodulating signals suitable for use in the transmission of television signals.

2. Description of the Related Art

Encoded transmission of inherently analog signals is increasingly practiced today as a result of advances in signal processing techniques that have increased the bit rate achievable in a channel. At the same time new data compression techniques have tended to reduce the bandwidth required to acceptably represent analog information.

Various modulation techniques have been employed in digital communications. For example quadrature amplitude modulation (QAM) is a relatively sophisticated technique favored by practitioners of digital radio communications. This method involves two separate symbol streams, each stream modulating one of two carriers in quadrature. A transmitted QAM signal can be represented by the equation $$x(t) = \sqrt{2}\left[\cos(w_c t)\sum_{m=-\infty}^{\infty} Re\{a_m\}g(t-mT)\right] - \sqrt{2}\left[\sin(w_c t)\sum_{m=-\infty}^{\infty} Im\{a_m\}g(t-mT)\right]$$

wherein $a_m$ is a finite sequence of transmitted symbols;
$g(t)$ is a real valued transmit filter; and
T is the symbol period.

As will be apparent to those skilled in the art this is equivalent to the modulation of two real-valued baseband pulse amplitude modulated (PAM) signals by the carrier signals $\cos(\Omega_c t)$ and $\sin(\omega_c t)$ respectively. As used herein the first term in the above equation is referred to as the "in-phase" component, and the second term is called the "quadrature" component.

This system achieves spectral efficiencies between 5–7 bits/sec-Hz in multilevel formats such as 64- and 256-QAM. QAM is particularly useful in applications having a high signal-to-noise ratio. However double sideband modulation is required, which requires increased channel bandwidth for the same symbol rate over single or vestigial modulation schemes. Furthermore cross-coupled channel equalizers are generally needed to cancel linear distortion in the channel, which adds to the overall complexity of the system.

A variant of QAM is quadrature phase shift keying (QPSK), in which a signal constellation consisting of four symbols is transmitted, each having a different phase and a constant amplitude. The scheme is implemented as the sum of orthogonal components, represented by the equation.

$$A_m = be^{j\theta_m}$$

where $\theta_m$ can be any of $\{0, \pi/2, \pi, 3\pi/2\}$. It is necessary to transmit both sidebands in order to preserve the quadrature information. The QPSK modulation scheme has been adopted by the ITU-T as an international standard for direct digital satellite broadcasting. In Europe 16-QAM and 64-QAM are used in the digital video broadcasting (DVB) standard for digital cable broadcasting. Both QAM and QPSK have similar coding schemes, which are generally described in FIG. 1 with reference to MPEG transport layer packets, wherein QPSK and QAM are implemented according to the standards DVB-S (European Telecommunication Standard PrETS 300 421) and DVB-C (European Telecommunication Standard PrETS 300 429) standards. MPEG is a standard well known to the art, in which data is grouped in a plurality of packets, each of which contains 188 bytes. This number was chosen for compatibility with asynchronous transfer mode (ATM) transmissions, another known telecommunication standard. Various aspects of the coding process are specified in the respective DVB standards, including: randomization and sync inversion for synchronization; Reed Solomon encoding; Forney interleaving; convolution encoding in the case of DVB-S, and byte to m-tuple mapping, and differential mapping in the case of DVB-C.

The art is presently striving to more efficiently transmit video and audio data in applications such as cable and direct satellite television using digital techniques.

SUMMARY OF THE INVENTION

It is therefore a primary object of the present invention to provide an improved signal processing system for the communication of data in a constrained channel.

It is another object of the invention to provide an improved, economical apparatus for receiving and decoding data at high bit rates, such as video and audio signals.

It is a further object of the invention to provide improved apparatus that economically and reliably provide locking for the demodulation frequency according to the modulator frequency in a communication system.

It is still another object of the invention to provide improved apparatus for economically and reliably locking the data sampling frequency according to the rate of transmitted data in a communication system.

These and other objects of the present invention are attained by a signal processing apparatus for processing signals that are sampled by a sampler operative at a sampling rate. The apparatus comprises a clock operative at the sampling rate, a first numerically controlled oscillator operative at periods T that are initially equal to the nominal baud rate of the signals, an interpolator, preferably a sinc interpolator, receiving samples at the sampling rate, and a loop filter coupled to the sinc interpolator. The loop filter has an output responsive to a difference between the periods T and a received symbol rate of the sampled signals. The first numerically controlled oscillator is responsive to the loop filter and generates an output signal that is representative of an interpolation distance between succeeding samples. The sinc interpolator interpolates the received samples according to the interpolation distance, and produces an output signal representative of the interpolated samples.

In an aspect of the invention the input signal is modulated, and the apparatus further comprises an I,Q demodulator. First and second analog-to-digital converters are respectively coupled to an in phase output and a quadrature output of the demodulator, wherein the sinc interpolator accepts in phase and quadrature signals.

In another aspect of the invention the loop filter accepts an in phase component of the interpolated samples and the error signal is computed according to the equation $$\text{error}(r) = I\left[r - \frac{T}{2}\right][I(r) + I(r-T)]$$

wherein I is the in phase component, T is the symbol period, and r is the interval between alternate samples.

In yet another aspect of the invention the loop filter accepts an in phase component and a quadrature component of the interpolated samples the error signal is computed according to the equation $$\text{error}(r) = I\left[r - \frac{T}{2}\right][I(r) + I(r-T)] + Q\left[r - \frac{T}{2}\right][Q(r) + Q(r-T)]$$

wherein I is the in phase component, Q is the quadrature component, T is the symbol period, and r is the interval between alternate samples.

In still another aspect of the invention the first numerically controlled oscillator, the sinc interpolator, and the loop filter comprise an integrated semiconductor circuit, preferably a CMOS circuit.

The apparatus includes a matched filter which has an input coupled to the sinc interpolator and an output coupled to the loop filter. Preferably the matched filter is a square-root raised cosine filter.

The output of the first numerically controlled oscillator comprises a first output signal that is generated whenever the state Ω exceeds a division of the symbol period, and the sinc interpolator generates an output in response to the first output signal. The output of the first numerically controlled oscillator includes a second output signal that is representative of a value Δ according to the equation $$\Delta = \text{fraction}\left[\left(\frac{2\Omega MOD1}{2}\right)\left(\frac{\text{system clock}}{\text{baud rate}}\right)\right]$$

wherein system clock is the clock rate, baud rate is the nominal baud rate, and Ω is a state representative of a number of elapsed operative periods of the first numerically controlled oscillator, and the sinc interpolator emits an interpolated sample upon receiving the second output signal.

According to an aspect of the invention the sinc interpolator is a unit comprising a first sinc interpolator that receives an in phase component of the samples, and a second sinc interpolator that receives a quadrature component of the samples. Preferably the sinc interpolator comprises a finite impulse response filter having a bank of coefficients.

In yet another aspect of the invention the bank of coefficients comprises a plurality of banks, and sinc interpolator is provided with an addressable memory containing a plurality of coefficients.

In another aspect of the invention the sinc interpolator performs a plurality of sinc interpolations that precede and follow a required sinc interpolation point, and the apparatus further comprises a linear interpolator that performs linear interpolation on the plurality of sinc interpolations.

The invention provides a circuit for processing modulated signals, comprising a semiconductor integrated carrier recovery circuit operative to control a demodulator that includes a second numerically controlled oscillator, and a digital derotation circuit which is responsive to the second numerically controlled oscillator and accepts an in phase component and a quadrature component of sampled signals. The carrier recovery circuit further comprises a phase error estimation circuit coupled to an output of the derotation circuit, and a loop filter coupled to an output of the phase error estimation circuit, wherein the second numerically controlled oscillator is responsive to the loop filter.

In a further aspect of the invention the circuit adaptively estimates the phase error and executes a least-mean-square algorithm. It comprises first and second slicers which accept a derotated in-phase value and a derotated quadrature value respectively; first and second subtracters for respectively determining first and second differences between the derotated in phase value and the sliced in phase value, and between the derotated quadrature value and the sliced quadrature value; and an angulator, accepting the first and second differences and outputting a phase error estimate.

Preferably the integrated circuit is a CMOS circuit.

The invention provides a signal processing apparatus for processing modulated signals at a modulation carrier frequency, comprising a demodulator, a sampler operative at a sampling rate on an output of the demodulator, and a carrier recovery circuit operative to control the demodulator in accordance with the modulation carrier frequency. The carrier recovery circuit comprises a second numerically controlled oscillator; a phase error estimation circuit; a digital derotation circuit responsive to the second numerically controlled oscillator and accepting an in phase component and a quadrature component of sampled signals; and a loop filter coupled to an output of the derotation circuit, wherein the second numerically controlled oscillator is responsive to the loop filter. The sampler and the carrier recovery circuit are integrated in a semiconductor integrated circuit, preferably a CMOS circuit.

In an aspect of the invention the carrier recovery circuit adaptively estimates the phase error according to the least-mean-square algorithm. It comprises first and second slicers which accept a derotated in-phase value and a derotated quadrature value respectively; first and second subtracters, for respectively determining first and second differences between the derotated in phase value and the sliced in phase value, and between the derotated quadrature value and the sliced quadrature value; and an angulator, accepting the first and second differences and outputting a phase error estimate.

The invention provides a signal processing apparatus for processing modulated signals that are sampled by a sampler operative at a sampling rate. The signals have a nominal baud rate. The apparatus comprising a clock, operative at the sampling rate; a first numerically controlled oscillator operative at periods T that are initially equal to the nominal baud rate; and a sinc interpolator receiving samples at the sampling rate. A first loop filter, coupled to the sinc interpolator and the first numerically controlled oscillator, has an output responsive to a difference between the periods T and a transmitted symbol rate of the sampled signals, wherein the first numerically controlled oscillator is responsive to the first loop filter and generates an output signal that is representative of an interpolation distance between succeeding samples, and the sinc interpolator interpolates the received samples according to the interpolation distance, and produces an output signal representative of the interpolated samples. A carrier recovery circuit comprises a second numerically controlled oscillator, a phase error estimation circuit, a digital derotation circuit responsive to the second numerically controlled oscillator and accepting an in phase component and a quadrature component of sampled signals, and a second loop filter coupled to an output of the derotation circuit, wherein the second numerically controlled oscillator is responsive to the second loop filter. The first and second numerically controlled oscillators, the sinc interpolator, the first and second loop filters, and the digital deroration circuit are integrated in a semiconductor integrated circuit.

In one form of the invention an analog-to-digital converter unit samples an input signal at the sampling rate and has an output coupled to the sinc interpolator. The analog to digital converter unit is integrated in the semiconductor integrated circuit.

In still another aspect of the invention the input signal is modulated, and the apparatus further comprises an I,Q demodulator, and a sampler comprising first and second analog-to-digital converters respectively coupled to an in phase output and a quadrature output of the demodulator, wherein the sinc interpolator accepts in phase and quadrature outputs of the sampler.

BRIEF DESCRIPTION OF THE DRAWING

For a better understanding of these and other objects of the present invention, reference is made to the detailed description of the invention, by way of example, which is to be read in conjunction with the following drawings, wherein.

DESCRIPTION OF THE PREFERRED EMBODIMENT

Figure 1:
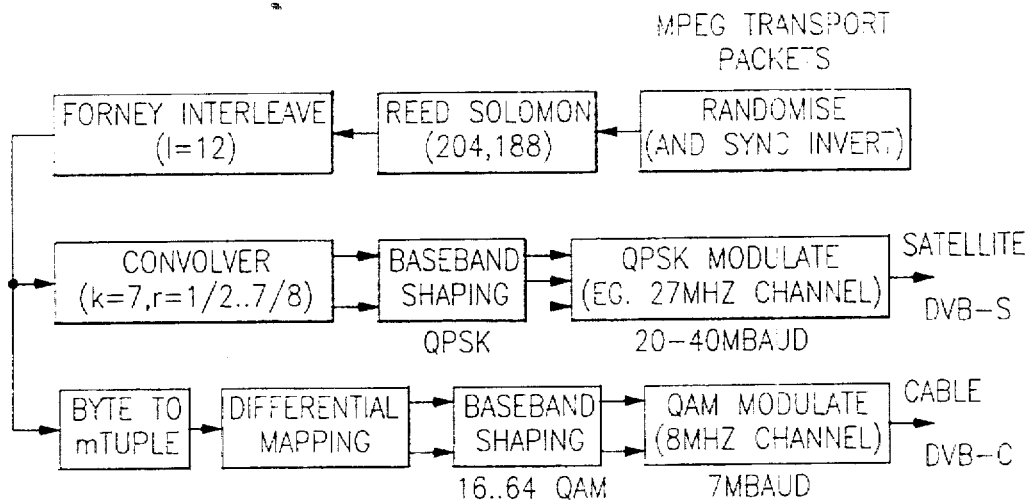
FIG. 1 is a block diagram illustrating QAM and QPSK coding and modulation.
Figure 2:
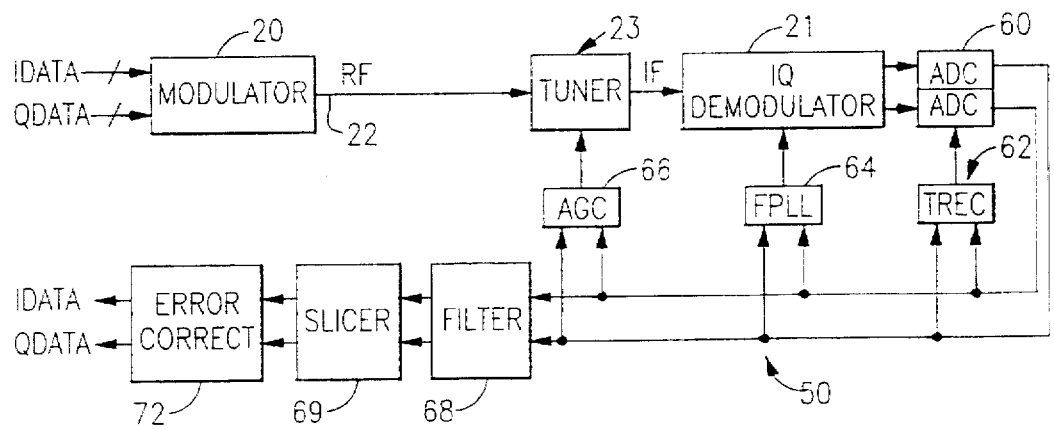
FIG. 2 is a block diagram showing modulation and demodulation in a communication system.
Figure 3:
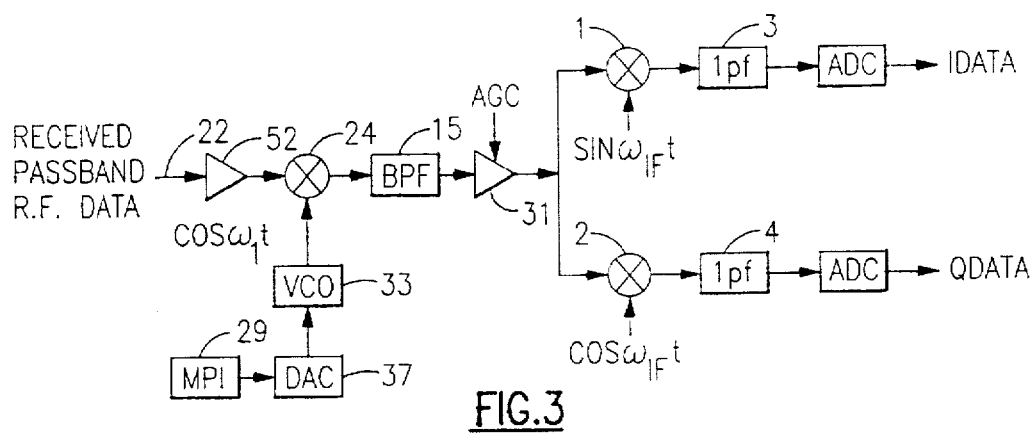
FIG. 3 is a more detailed block diagram of the tuner and I,Q demodulator shown in FIG. 2.

The organization of a digital receiver 50 is shown in FIGS. 2 and 3. Although the invention is explained with reference to a particular digital receiver, it will be understood by those skilled in the art that it can be practiced in many forms of modulation and demodulation wherein it is needed to accurately lock the demodulation frequency to the modulation frequency. Similarly the teachings herein are applicable to many systems wherein carefully synchronized conversion of an analog signal to a digital signal is required.

FIG. 2 illustrates a block diagram of a communications system which includes a digital receiver 50. A modulator 20 modulates and transmits a signal across a communications channel 22, which is initially accepted by a receiver front end 23, and demodulated in an I,Q demodulator 21. The demodulated signal is sampled in an analog-to-digital converter ADC 60. Timing recovery is performed in timing recovery circuitry 62. Carrier recovery is accomplished in a carrier recovery circuit 64. The receiver typically includes an automatic gain control (AGC) circuit 66. The sampled data is processed through a matched filter 68, and is then subjected to a slicer 69 and error correction circuitry 72, as discussed below.

In the receiver front end 23, a radio frequency amplifier 52 is coupled to the communications channel 22. The channel is typically a constrained channel, such as a satellite downlink, or a television cable, but can be any communications channel. The output of the radio frequency amplifier 52 is demodulated to a first intermediate frequency by the first demodulator 24, and then passed through a band pass filter 25. The first demodulator 24 is of a known type. Its frequency is controlled by a voltage-controlled oscillator 33, programmed through a microprocessor interface 29 operating through a digital-to-analog converter DAC 37. The intermediate frequency (IF) signal output from the amplifier 31 is demodulated in the I,Q demodulator 21 (FIG. 2) to a complex baseband representation using demodulator subunits 1,2 included therein, and passed through low pass filters 3, 4 to produce the output signals Idata and Qdata, which are the in phase and quadrature components respectively. These signals are converted into a digital representation using a high speed analog-to-digital converter unit ADC 60.

Figure 4:
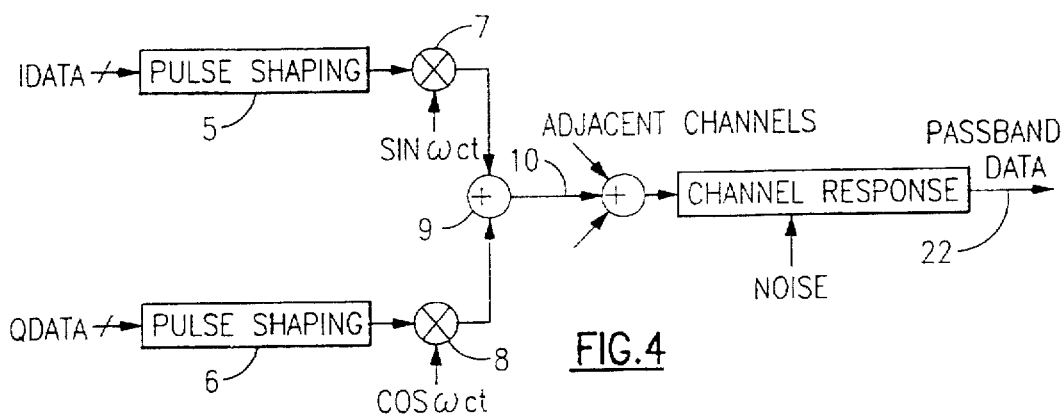
FIG. 4 is a diagram illustrating a portion of the modulator circuit shown in FIG. 2.

The signal received from the channel 22 has been modulated as shown in FIG. 4. Pulses comprising the in phase component Idata and the quadrature component Qdata are filtered through raised root cosine filters 5 and 6 respectively, modulated on orthogonal carriers at the carrier frequency $\omega_c$ in multipliers 7, 8, and summed in an adder 9. Typically signals in adjacent passbands are transmitted along with the desired signal 10. In typical applications the excess bandwidth of the shaped pulses exceeds the Nyquist minimum by 35%. Optionally, the modulator may include an intermediate frequency (IF) stage (not shown). For a symbol period T of 33 ns, the Nyquist frequency is approximately 15

MHz, equivalent to approximately 30 MHz in the passband. For such a signal, a 40.5 MHz channel at 3 db rolloff would be required. The adjacent channels, channel distortion, and noise all must be considered in the design of the receiver and demodulator. The details of demodulation depend on the communications channel.

Referring again to FIG. 2, a high speed analog to digital converter, ADC 60, provides an output which is used for timing recovery circuitry 62, which insures accurate sampling by ADC 60. In order to successfully recover the original data, the receiver is required to accomplish at least the following tasks:

(a) lock the demodulation frequency to the modulation frequency;
(b) lock the data sampling frequency to the transmitted symbol rate;
(c) adjust the gain of the tuner for optimal signal to noise;
(d) complete the pulse shaping to minimize intersymbol interference (ISI)
(e) perform a Nyquist filter operation to reject out-of-channel noise;

A carrier recovery circuit 64 controls the I,Q demodulator 21 such that the correct frequency and phase are recovered. The AGC circuit 66 feeds back to radio frequency amplifier 52. Both the AGC circuit 66 and the carrier recovery circuitry 64 are coupled to the output of ADC 60. The main digital data stream from the ADC 60 is filtered by a matched filter 68, which precisely matches the characteristics of the transmit filters (not shown). A slicer 69 extracts the data from the filter output 68, determines the nearest legal constellation point, and applies a representation in appropriate format to the error correcting circuitry 72. The specification for the error correction is specified in the DVB specification, and will not be further discussed as it is outside the scope of the invention.

Before proceeding to a further detailed description of the preferred embodiment, it is believed that the invention can be more clearly understood by comparison to FIGS. 6–9, which illustrate a conventional approach to the problems of carrier recovery and timing recovery. An off-chip I,Q quadrature demodulator 10 is employed in the tuner. An external voltage controlled oscillator 42 is controlled by carrier recovery circuitry block 44 in order to lock the demodulator clock to the frequency and phase of the transmitted signal. Typically the voltage controlled oscillator 42 can be adjusted across a range of several MHz. The sampling of the transmitted circuit is locked to the transmitted symbol rate and phase by an external voltage controlled oscillator 46, which is typically a crystal oscillator. The oscillator 46 is controlled by timing recovery circuitry 48, but is generally limited to a range of a few hundred KHz. Because different satellite transponders and cable television systems use different symbol rates, a plurality of voltage controlled oscillators (not shown) may be required to accommodate the diversity of transmission arrangements, or the device may be limited in its application to a particular transmission system. The demodulated data is sampled at T/2, the system clock rate in analog-to-digital converters 45, 47. At a symbol rate of 30 Mbaud, the system clock is therefore running at 60 MHz. T/2 sampling is required for a Gardner timing recovery loop. However other circuitry outside the timing recovery loop is generally clocked a the slower rate of T to simplify implementation and reduce circuit area. After filtering in matched filters 54, 56 the I,Q outputs 58, 59 are sent to a slicer and error correcting circuitry (not shown) as required by a particular application.

The matched filters 54, 56 are typically implemented as square-root raised cosine matched filters, having an excess bandwidth α=0.35 to conform to the DVB specification. These filters match a transmit filter (not shown) that was employed in transmitting the input signal so as to restore the signal to its pretransmission character.

Figure 7:
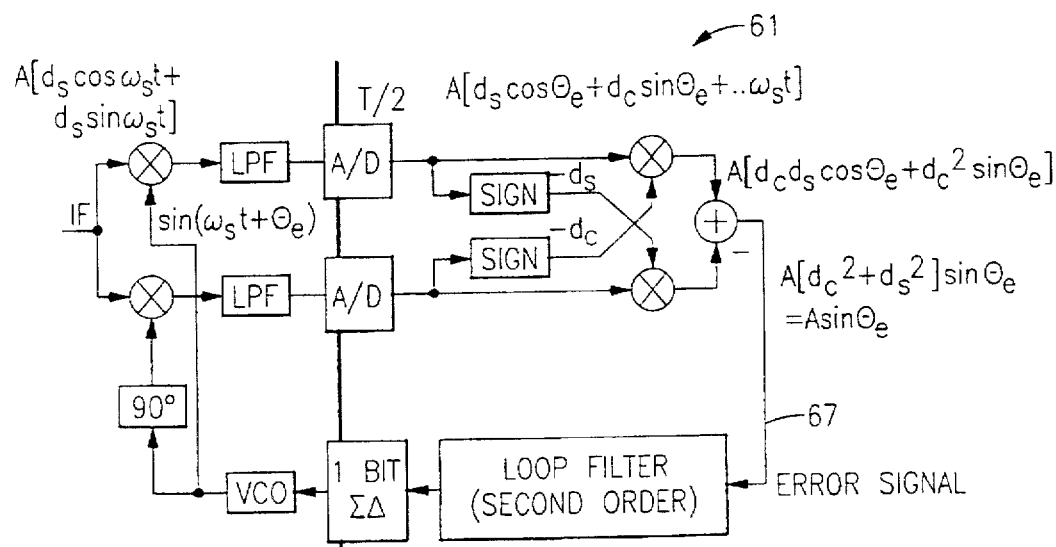
FIG. 7 is a more detailed block diagram of the carrier recovery circuit shown in FIG. 6.

The carrier recovery circuitry 44 may be implemented as a conventional Costas Loop, referenced generally at 61 in FIG. 7. After a channel change there may be a significant frequency error which has to be determined before phase can be acquired. A frequency-lock-loop of the type where the error signal 67 is proportional to the frequency error, or a frequency sweeping scheme can be used to determine the initial frequency error.

Figure 8:
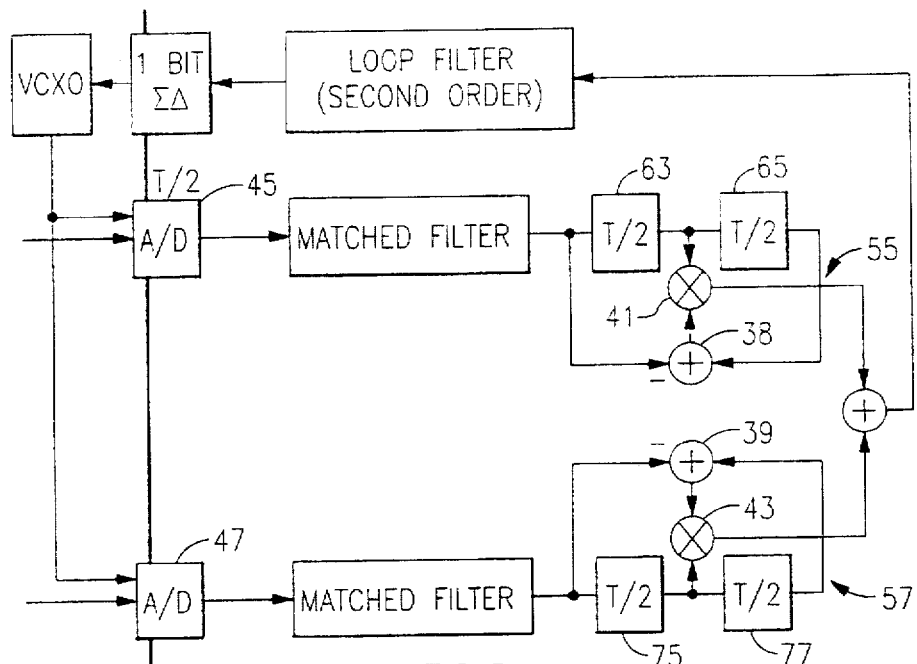
FIG. 8 is a more detailed block diagram of the timing recovery circuit shown in FIG. 6.
Figure 9:
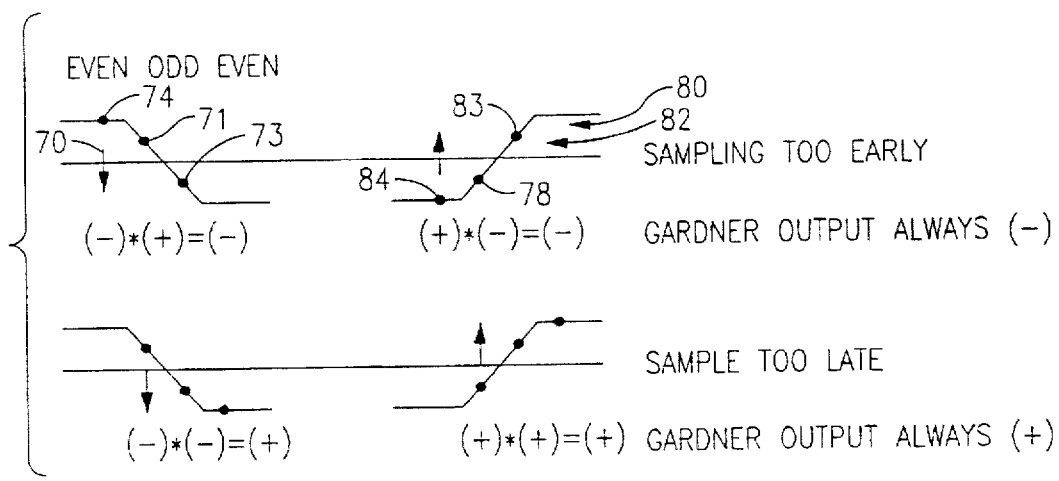
FIG. 9 is a diagram that illustrates the operation of the Gardner algorithm.

The timing recovery circuitry 48 is shown in more detail in FIG. 8. A conventional Gardner algorithm is employed, which acquires the timing sample point for T/2 sampling by the A/D converters 45, 47, and the units 55, 57. Even-numbered samples are used as data samples, while odd-numbered samples correspond to zero crossings. An error is computed according to the equation $$\text{error}(r) = I\left[r - \frac{T}{2}\right][I(r) + I(r-T)] + Q\left[r - \frac{T}{2}\right][Q(r) + Q(r-T)]$$

where
I is the in phase output;
Q is the quadrature output;
T is the symbol period;
r is the sample time of the even sample.

The Gardner algorithm is explained in greater detail in *A BPSK/QPSK Timing-Error Detector for Sampled Receivers*, Gardner, Floyd M., IEEE Trans. Comms, COM-34, May 1986, pp. 423–9. Qualitatively, the error signal indicates the direction the timing sample point has to move in order to lock odd-numbered T/2 samples to the midpoint between samples, and to lock even-numbered sample points to the near optimal sample point. As the data is randomized in practical systems, there are an adequate number of zero crossings.

According to the algorithm the difference is calculated between a succeeding even-numbered sample and a preceding even-numbered sample in subtracters 38, 39. This difference is multiplied in multipliers 41, 43 by the odd-numbered sample therebetween. The case where the sample point is too early will be explained with reference to FIG. 9. In the case of a falling edge 70, the intermediate odd-numbered point 71 has a positive value. The difference between the even-numbered points 73, 74 is negative, because the succeeding point 73 is closer to the zero line than the preceding point 74. Thus the product has a negative value. For a rising edge 80, the odd-numbered intermediate point 78 has a negative value. The difference between the succeeding even-numbered points 82, 84 is positive. Thus the product also has a negative value.

A similar analysis reveals that in the case of late sampling, the Gardner algorithm yields a positive value in both rising and falling edges. In the interest of brevity it will not be repeated.

The error value indicates in which direction the sample point must move to align it correctly.

When the sample point is correct, the error value reported by the Gardner algorithm is zero, except for noise and inter-symbol interference (ISI) effects. However the noise effects have a zero mean.

After processing, the even-numbered samples are sliced to give the reconstructed data which is applied to the error correcting circuitry. The odd-numbered samples are discarded before derotation. Of course it is equally possible to slice the odd-number samples and discard the even-numbered samples with appropriate modifications of the timing recovery circuitry. Similarly, sampling at other divisions of T could be employed. Although locking with odd-numbered samples at the zero crossing points does not guarantee that the optimum sampling point has been found for the data, the scheme works well in practice. Alternative schemes which more closely lock onto the point having a maximum likelihood of correctness could be used, but these are generally more complicated to implement.

The logic in the timing recovery circuit 48 operates at T, because an error estimate is generated only every other sample. However it requires two T/2 cycles for an even-numbered sample to propagate to the next even-numbered position in the shift registers 63, 65, 75, 77 (FIG. 8). Thus the samples are clocked through at T/2.

Figure 10:
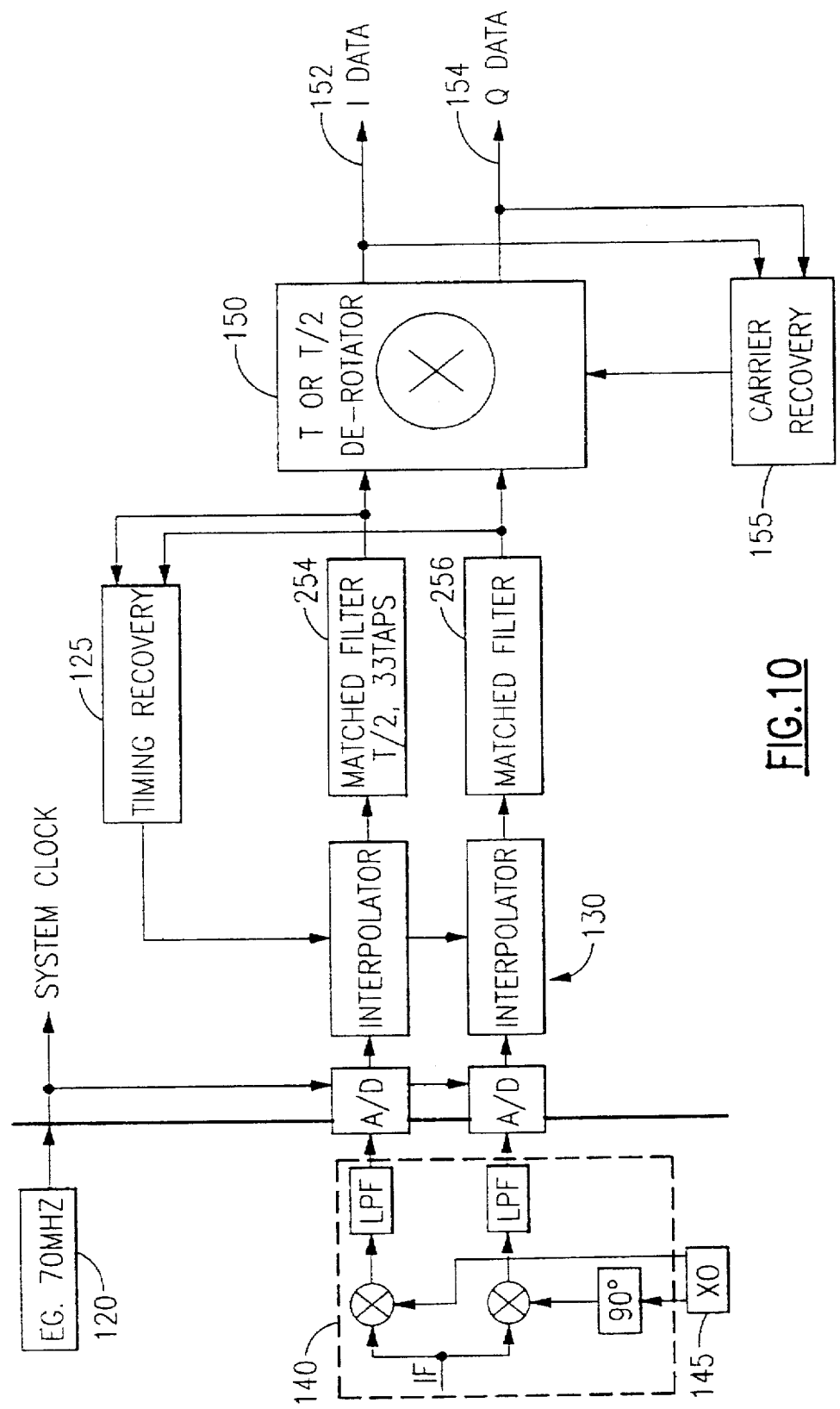
FIG. 10 is a block diagram of a carrier recovery and a timing recovery circuit according to the invention.

A preferred embodiment of the invention will now be explained initially with reference to FIG. 10. It has an advantage over the conventional circuit discussed above, in that the carrier and timing loops have been implemented entirely within the digital domain, and are integrated on a CMOS chip. As a result external system component costs are reduced. A further advantage of the arrangement is that the demodulator can work at many different symbol rates, or with variable symbol rate technology. As discussed above, the prior art solution required the variable crystal controlled oscillator to match the symbol rate.

A conventional off-chip I,Q baseband demodulator 140 is employed. A suitable I,Q quadrature baseband demodulator is the GEC Plessey SL1710 I,Q demodulator. The external sample timing recovery loop has been replaced by a fixed frequency system clock 120, which clocks the logic. It must at least equal the data Nyquist frequency, or otherwise ensure that the data Nyquist frequency is met. An on-chip interpolator unit 130, which, under control of the timing recovery loop 125, generates synchronous T/2 spaced sample value. At each system clock tick, either one or zero T/2 samples are generated by the interpolator unit 130. In the event that a sample has been generated, subsequent hardware modules are so informed by the assertion of a "valid" control strobe 170 (FIG. 11).

Figure 6:
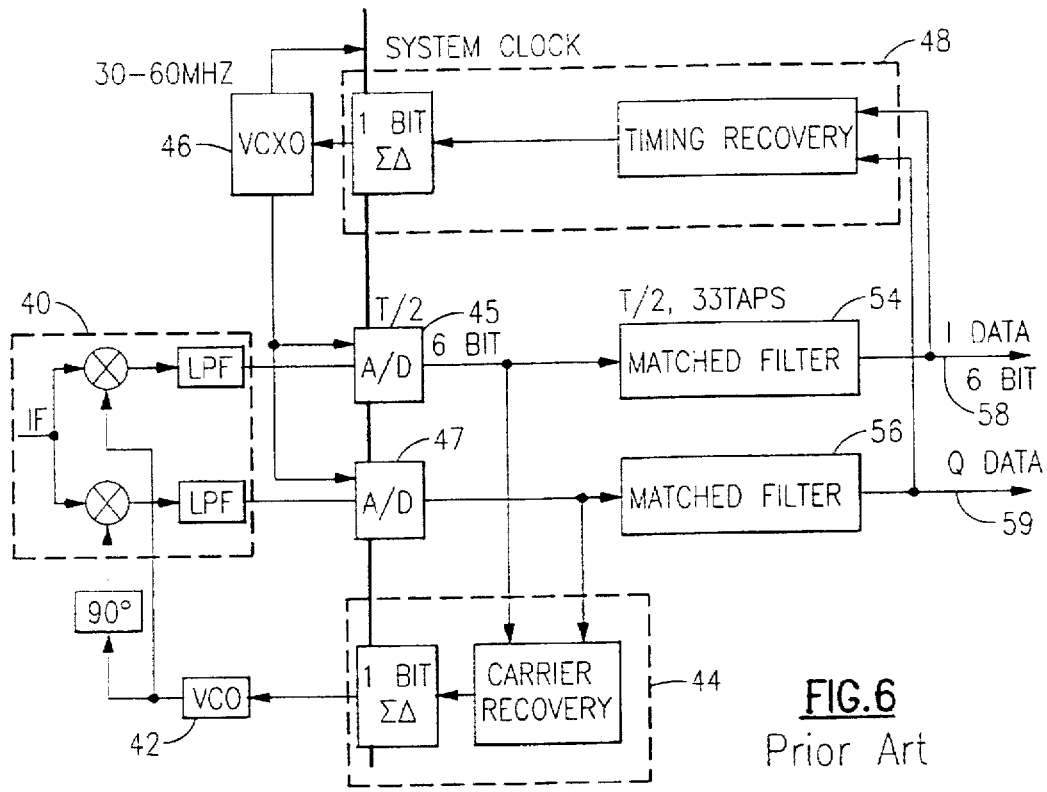
FIG. 6 is a block diagram of a carrier recovery and a timing recovery circuit in a receiver according to the prior art.

The external carrier recovery loop illustrated in FIG. 6, including the external voltage controlled oscillator 46, has been replaced with a fixed frequency external crystal oscillator 145. The oscillator 145 cooperates with an on-chip digital derotater 150, and an on-chip carrier recovery loop 155. Both the derotater 150 and the carrier recovery loop 155 are operative with T-spaced samples. The I and Q outputs 152, 154 are applied to the slicer and error correction circuits in accordance with the DVB specification.

Timing Recovery

Figure 11:
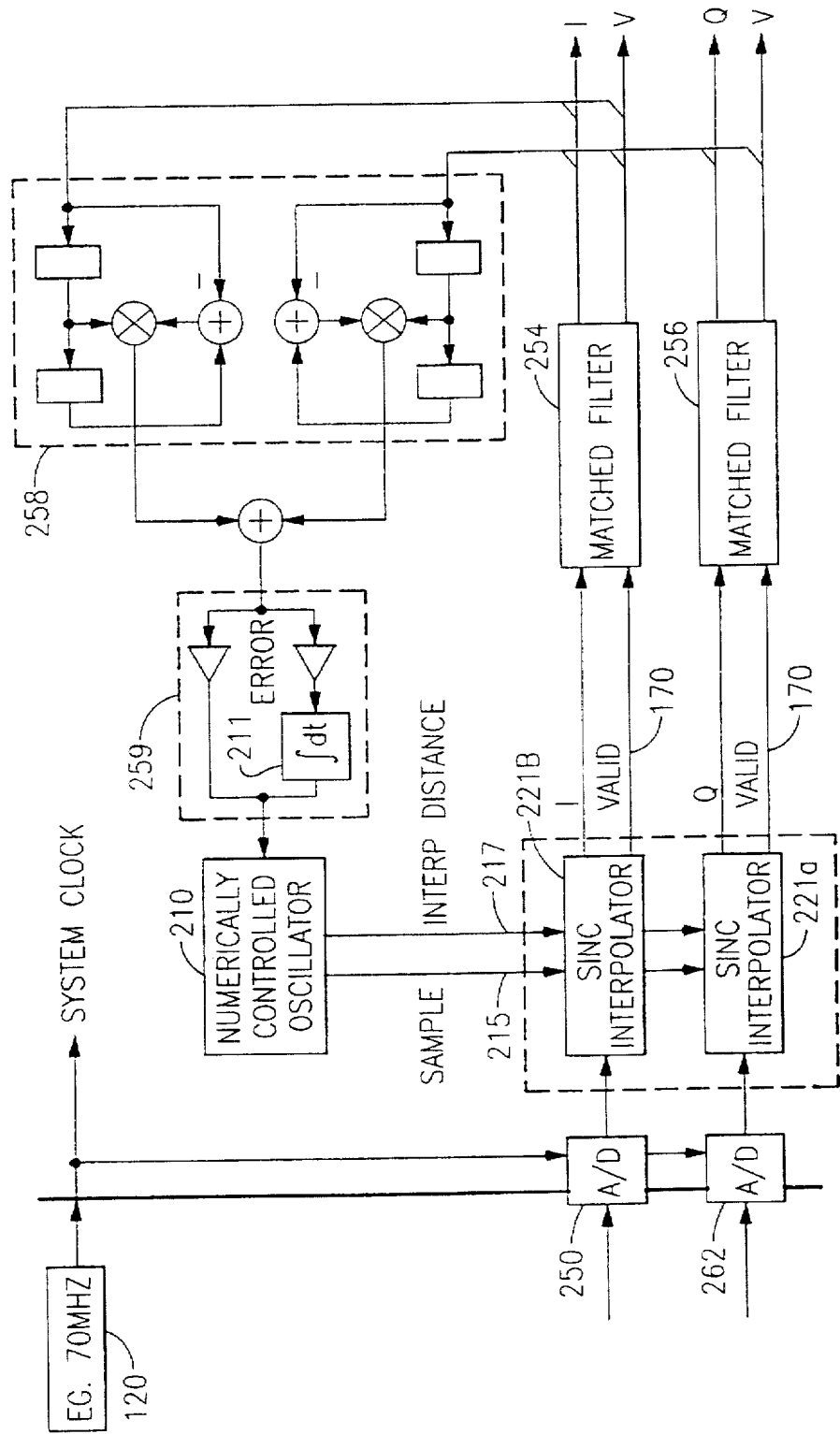
FIG. 11 is a more detailed, partially schematic block diagram which illustrates the timing recovery circuit shown in FIG. 10.
Figure 12:
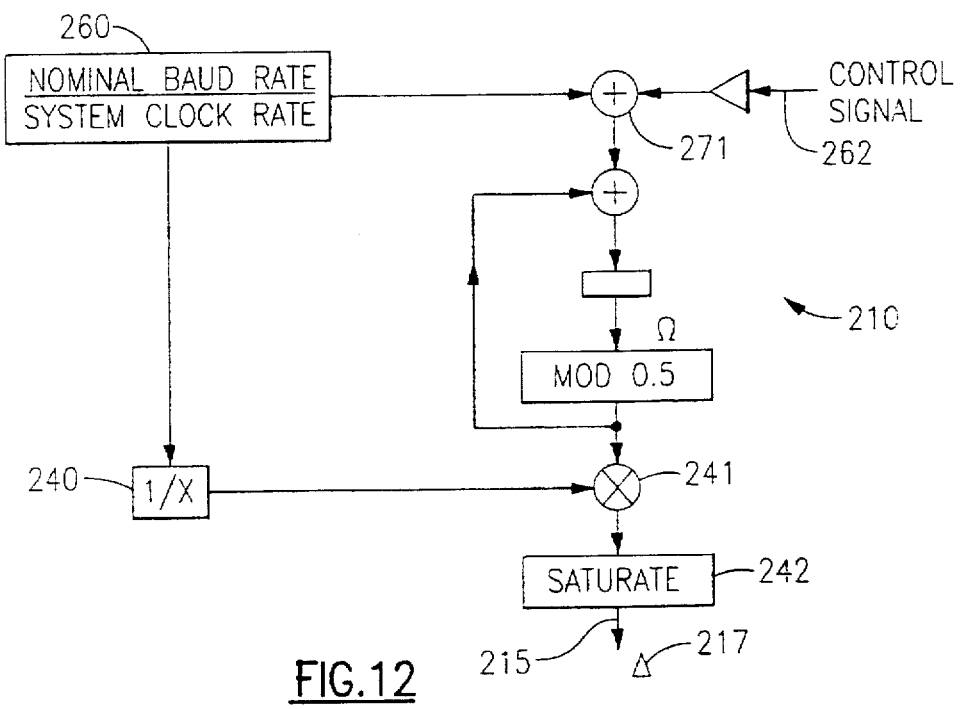
FIG. 12 is a schematic illustrating a numerically controlled oscillator in the timing recovery circuit shown in FIG. 11.

The timing recovery circuit according to the invention is shown in greater detail in FIGS. 11 and 12. Quadrature demodulated data is sampled at the system clock rate, which, as explained above, must be at least equal to Nyquist frequency of the input data. As illustrated in FIG. 12, an on-chip numerically controlled oscillator, shown generally at 210, keeps count of symbol time. The state $\Omega$ of the numerically controlled oscillator 210 represents a fixed point count of the number of symbol periods which have elapsed. At each system clock tick, the state $\Omega$ increments by a value in a register 260 equal to the (nominal baud rate/system clock rate), adjusted from the nominal using a control signal 262. The reciprocal of the value in the register 260 is taken in a reciprocal generator 240. The reciprocal is multiplied by the value $|(2\,\Omega)\bmod 1|/2$ in a multiplier 241, and limited to a value that is less than 1 in saturation block 242.

Figure 13:
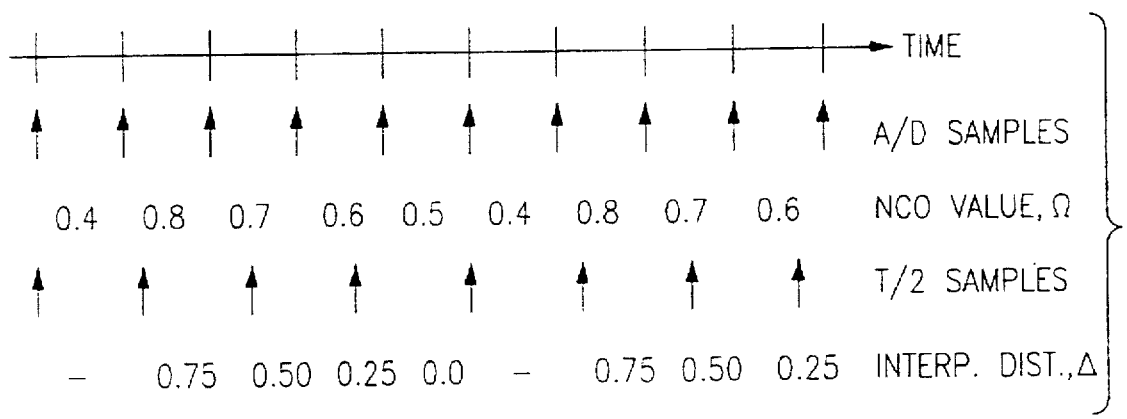
FIG. 13 is a diagram illustrating the operation of the circuit of FIG. 11.

Referring now to FIGS. 11 and 13, an example is shown that illustrates the operation of the circuit shown in FIG. 11, wherein the (nominal baud rate/system clock rate)=0.4. Whenever the state $\Omega$ passes a T/2 mark, indicated by the lower row of upward directed arrows in FIG. 13, the numerically controlled oscillator 210 outputs a signal 215, and a value $\Delta$ 217 which represents an interpolation distance between successive samples given by $$\Delta = \text{fraction}\left[\left(\frac{2\Omega MOD1}{2}\right)\left(\frac{\text{system clock}}{\text{baud rate}}\right)\right].$$

The signals 215, and $\Delta$ 217 are accepted by a sinc interpolator unit 222, comprising an individual sinc interpolator 221a, 221b for each of the in-phase and quadrature components. The interpolator unit 222 then generates a sample value based on the interpolation distance. $\Delta$ has a value greater than or equal to 0 and less than 1, but is represented as a fixed point number. Values greater than or equal to 1 are saturated to just less than 1. $\Delta$ can occasionally evaluate to greater than 1 when the control signal is positive. Under these conditions the value is limited to just under 1. The sinc interpolator unit 222 is instructed to generate a leading or a lagging sample according to whether $\Delta$ is 1 or 0 respectively. The spread of sample times covered by the interpolator is one system clock period.

The numerically controlled oscillator 210 operates in a timing loop based on the Gardner algorithm discussed above. Other timing recovery algorithms may also be used, such as the Mailer and Mailer algorithm. A second order loop filter 259 is used. A proportional-integral (PI) controller 211 is included in the circuit. Its proportional and integral gain constants are selected to give the required damping factor and natural frequency. Preferably a relatively high natural frequency is used for initial channel acquisition in order to minimize lock time and insure acquisition. Thereafter the coefficients are changed to reduce the loop bandwidth and thereby make it less sensitive to noise and fluctuations. This "gear shifting" operation improves the overall system bit error rate.

The matched filters 254, 256, preferably square-root raised cosine matched filters, are included because the Gardner algorithm assumes data having no ISI. They cannot be placed before the interpolator unit 222 because they have hard-wired coefficients designed for T/2 sampled data. As discussed above, the Gardner algorithm locks the timing sample point using T/2 samples. The loop preferably acquires the sample point such that odd samples are at the zero crossing points of the input data, and the even samples are used as data samples.

A delay is imposed between the presentation of system clock rate samples to the sinc interpolator unit 222 and the appearance of interpolated samples, according to the following equation $$\text{delay}=D+k\delta$$

where $\delta$=(system clock period/N);

N is the number of sinc interpolation points;

k=(integer) interpolation distance, $\Delta$N; and

D=constant delay implicit in hardware.

The sinc interpolator unit 222 is based on a finite impulse response filter, which is clocked at the system clock rate, with the coefficients being selected from a bank of N sets, wherein each set of coefficient interpolates a different delay. The interpolation distance output from the numerically controlled oscillator 210 determines which bank of coefficients are used to generate a given sample, as Δ varies from 0 to 1. This can be appreciated with reference to FIG. 5, wherein the oval indicators represent interpolation possibilities. Sinc interpolation is based on the sampling theory which shows that a signal which has been Nyquist sampled can be reconstructed using sinc pulses, equivalent to performing a low pass filtering operation in the frequency domain. The output is given by the equation $$y(t) = \sum_{k=-\infty}^{\infty} \times (kT) \text{sinc}\left[\frac{\pi(t-kT)}{T}\right].$$

Figure 15A:
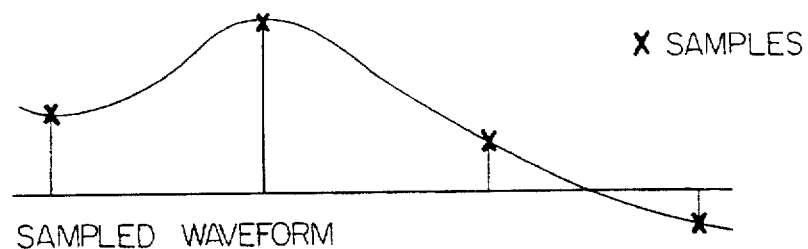
FIGS. 15a, 15b, 15c are plots which indicate the process of sinc interpolation.
Figure 15B:
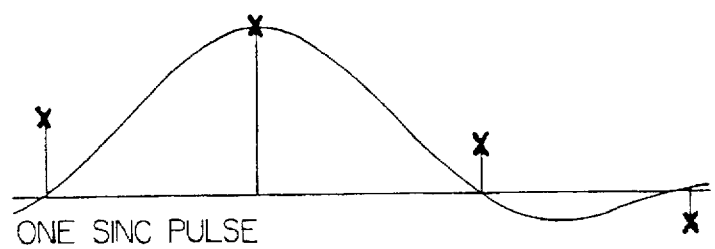
Figure 15C:
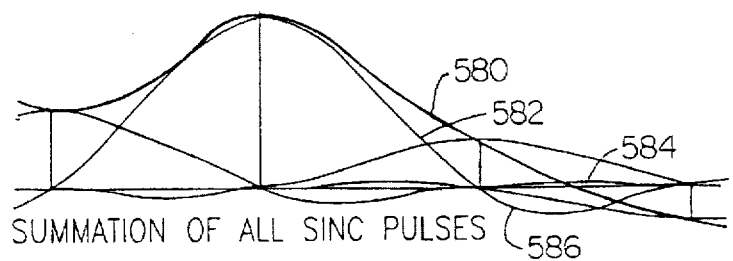

Referring to FIGS. 15a–15c, it will be seen that the reconstructed waveform 580 is the sum of all the components, representatively shown as lines 582, 584, and 586. There is only one non-zero component at each sample point, as shown in FIG. 15b. To make implementation possible, i.e. to make the system causal, the tails of the sinc pulse have to be trimmed. This introduces negligible error. In order to interpolate the value of the signal at a point between known samples, it is necessary to sum the contribution made at that point by each known sample. The contributions are calculated based on the amplitude of the samples and the shape of the sinc pulse. The FIR filter 250 (FIG. 16) is used to calculate and sum the contributions. The coefficients of the filter 250 are calculated based on a system clock rate sinc pulse.

Figure 16:
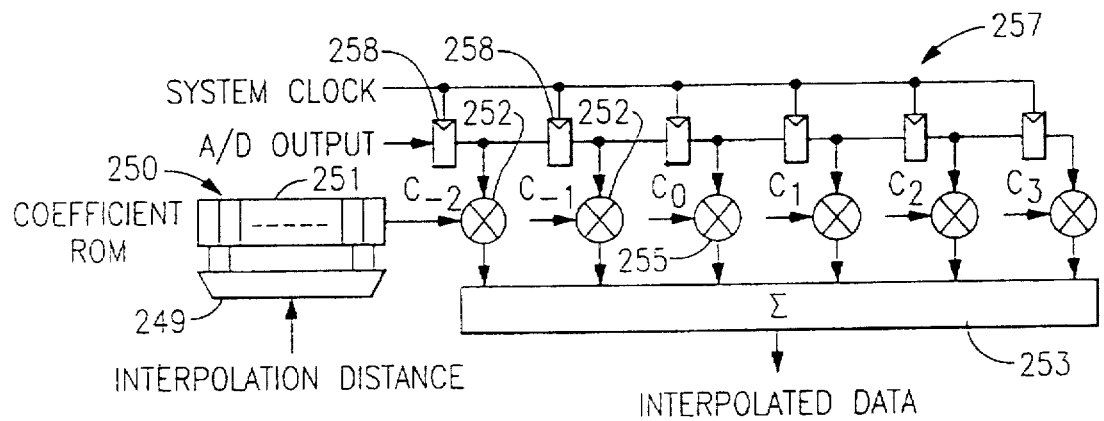
FIG. 16 is a schematic of a filter used in the sinc interpolator unit of the circuit shown in FIG. 10.

As shown in FIG. 16, the finite impulse response (FIR) filter 250 has a plurality of multipliers 252, each having a small read only memory (ROM) 251. The multipliers 252 operate in parallel. Only the ROM 251 for the left-most multiplier 252 is shown for clarity, it being understood that each multiplier is operatively associated with a ROM. Many forms of memory could alternatively be used. For example in certain applications it may be desirable to operate the receiver under control of a microprocessor (not shown) and the memory ROM 251 could be realized as a RAM, with programmable values. Microprocessor interfaces for sampling receivers are well known, and will not be further discussed herein. The coefficients for each delay phase is stored within the ROMs 251, and an appropriate coefficient is selected in the ROM 251 by addressing logic 249 according to the interpolation distance provided by the numerically controlled oscillator 210. The addressing arrangement for the ROMS 251 is conventional. The filter 250 includes a shift register 257 having plurality of tapped positions 258.

The coefficients that are stored in the ROMs 251 are based on a system clock rate sinc pulse. The zero delay coefficients have the sinc pulse centered at zero, and model the latest signal arrival when Δ=0. The maximum delay coefficients correspond to a sinc pulse centered at (N−1)/N system clock periods and are used whenever Δ>(N−1)/N.

Raised cosine sinc pulse coefficients, preferably with α=0.35, are generated using the general formula $$c(x) = \left[\frac{\sin\left(\frac{\pi x}{T}\right)}{\frac{\pi x}{T}}\right]\left[\frac{\cos\left(\frac{\alpha \pi x}{T}\right)}{1-\left(\frac{2\alpha x}{T}\right)^2}\right]$$

where $$x = cT \cdot n\left(\frac{T}{N}\right)$$

and c is the coefficient number (e.g. −2, −1, 0, 1, 2);
n is the interpolation distance 0, . . . N−1.

The tap values for a 6 tap, 8 phase interpolator are given in the following table. Row 8 is not implemented.

TABLE 1

6-tap, 8-phase interpolation - FIR filter coefficients

| bank (n) | Δ | $c_0$ | $c_1$ | $c_2$ | $c_3$ | $c_4$ | $c_5$ |
|---|---|---|---|---|---|---|---|
| 0 | 0 ≦ Δ < 0.125 | 0 | 0 | 1.000 | 0 | 0 | 0 |
| 1 | 0.125 ≦ Δ < 0.250 | 0.033 | −0.093 | 0.974 | 0.127 | −0.042 | 0.014 |
| 2 | 0.250 ≦ Δ < 0.375 | 0.053 | −0.150 | 0.895 | 0.281 | −0.089 | 0.030 |
| 3 | 0.375 ≦ Δ < 0.500 | 0.061 | −0.171 | 0.772 | 0.450 | −0.132 | 0.046 |
| 4 | 0.500 ≦ Δ < 0.625 | 0.057 | −0.163 | 0.619 | 0.619 | −0.163 | 0.057 |
| 5 | 0.625 ≦ Δ < 0.750 | 0.046 | −0.132 | 0.450 | 0.772 | −0.171 | 0.061 |
| 6 | 0.750 ≦ Δ < 0.875 | 0.030 | −0.089 | 0.281 | 0.895 | −0.150 | 0.053 |
| 7 | 0.875 ≦ Δ < 1.000 | 0.014 | −0.042 | 0.127 | 0.974 | −0.093 | 0.033 |
| 8 | not used | 0 | 0 | 0 | 1.000 | 0 | 0 |

The data generated by the multipliers 252 are summed in an adder unit 253 and output as interpolated data.

Figure 14A:
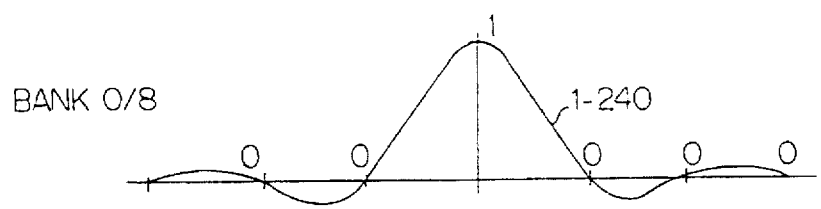
FIGS. 14a and 14b are plots of sinc pulses having different delay values which are helpful in understanding the operation of the circuits illustrated in FIGS. 11-13.
Figure 14B:
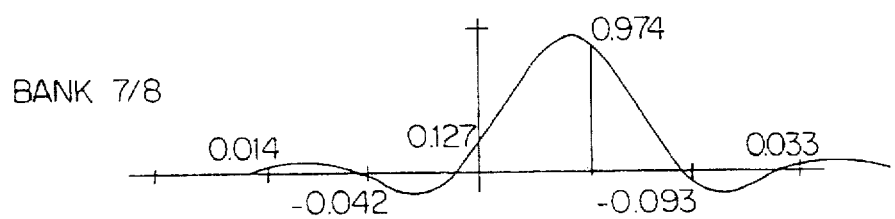

The operation of the sinc interpolator unit 222 can be further appreciated with reference to FIGS. 5, 14a, 14b and 15a–c, wherein two exemplary delays apply. For the examples it is assumed that the interpolator has a 6-tap filter and 8 phases. In actual practice the number of taps and phases are selected according to the application and the resolution desired. In FIG. 14a, the coefficients for Bank 0 is shown. Only the center tap coefficient is non-zero. Thus the output data is based solely on the contents of the analog-to-digital value in the position 255, multiplied by a value memorized in its associated ROM (not shown). In FIG. 14b a longer delay is involved, and bank 7 of the banks 0–8 has been selected, with the coefficients as shown. For example the coefficient of the center tap has a value of 0.974. Interpolation makes use of the known sinc pulse shape of the received data.

Figure 5:
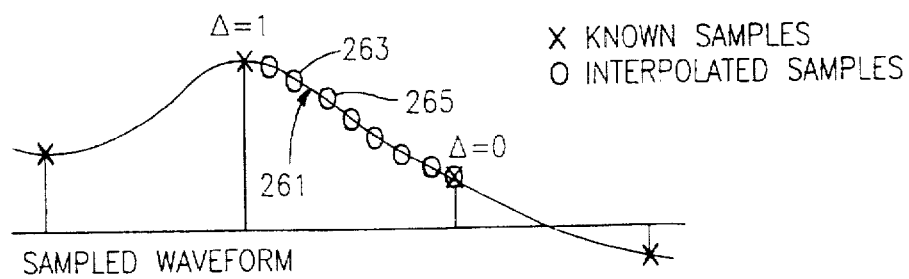
FIG. 5 is a plot showing interpolated samples disposed between known samples.
Figure 17:
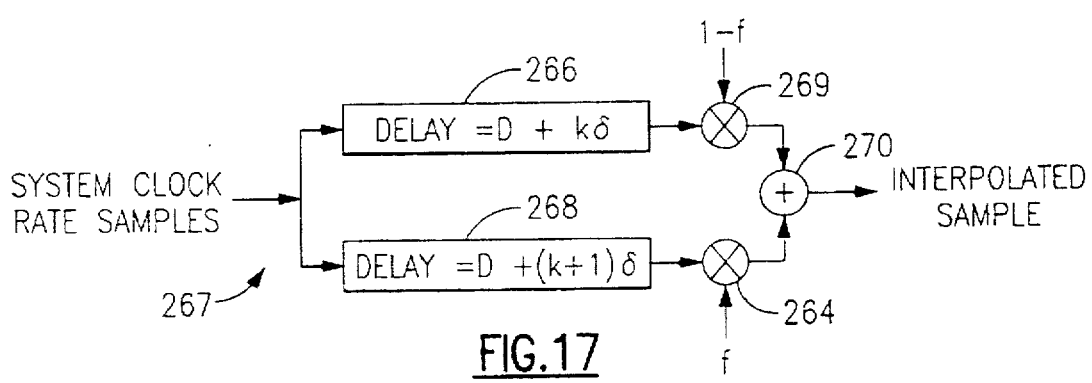
FIG. 17 is a schematic of a linear interpolation unit that can be used in the circuit of FIG. 10.

The accuracy of interpolation in the unit may optionally be increased by incorporating a level of linear interpolation, as shown in FIG. 17, which illustrates a linear interpolation unit 267. This performs linear interpolation on sinc interpolated values. As shown in FIG. 5, a required interpolation point 261 is bracketed by preceding and succeeding sinc interpolation points 265 and 263 respectively. Linear interpolation to determine the value of point 261 is performed based on the points 265, 263. In FIG. 17

δ=(system clock period/N);
N is the number of sinc interpolation points;
k=(integer) interpolation distance, ΔN;
D=constant delay implicit in hardware; and
f=(fraction) interpolation distance, ΔN.

Each system clock sample is sinc interpolated at interpolation points k, and k+1 in sinc interpolation units 266, 268. The interpolation results are multiplied by 1-f, and f in multipliers 269, 264 respectively, and the result combined in an adder 270. An interpolated sample value is output.

Figure 18:
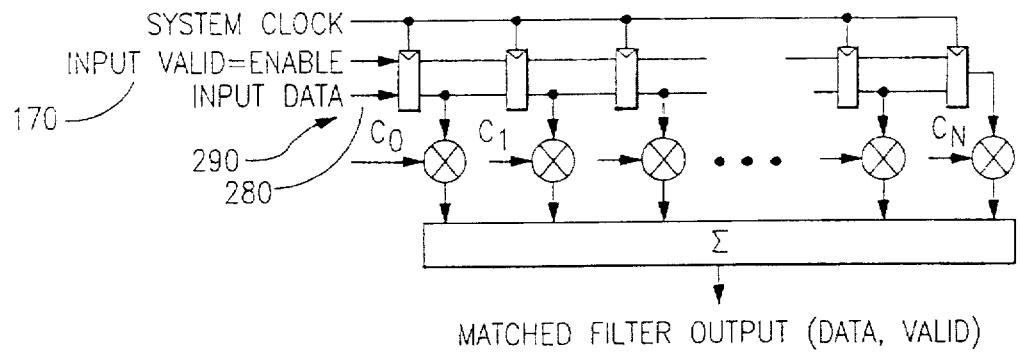
FIG. 18 is a schematic of a matched filter that is used in the circuit of FIG. 10.

Referring to FIGS. 11 and 18, the matched filters 254, 256 are implemented as finite impulse response filters, and are enabled by the valid signal, Strobe 170, that is generated by the interpolator unit 222. An exemplary filter 290 is illustrated in FIG. 18. Operation of the shift register 280 is enabled with the valid signal 170. One output sample is generated for each valid input sample. The FIR coefficients $c_0$ . . . $c_n$ are calculated for a T/2 FIR square-root raised cosine filter assuming an excess bandwidth α=0.35. The use of the valid strobe signal 170 emulates clocking with a system clock of T/2, although within the filter hardware is actually being clocked at a faster rate, that of the system clock 120 (FIG. 10).

Carrier Recovery

Figure 19:
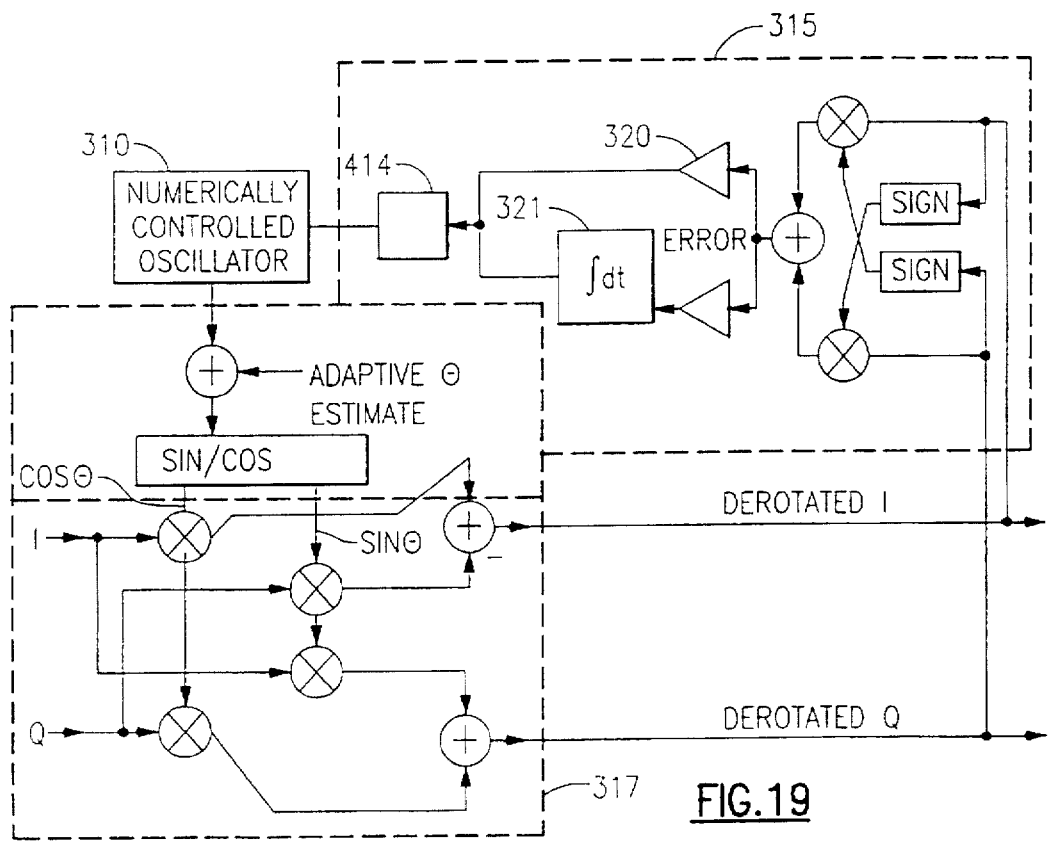
FIG. 19 is a block diagram of a carrier recover circuit according to the invention.
Figure 20:
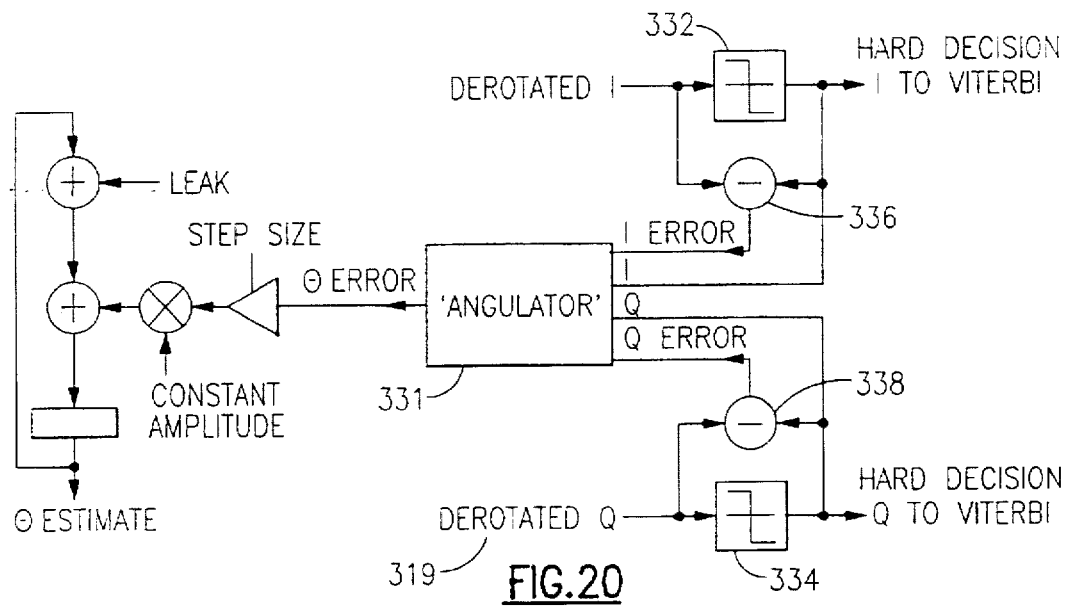
FIG. 20 is a block diagram of an adaptive phase tracking circuit that is used in the carrier recovery circuit depicted in FIG. 19.

The carrier recovery loop is explained initially with reference to FIGS. 19 and 20, which illustrates a Costas algorithm phase error estimation section 315, a second order loop filter 320, a numerically controlled oscillator 310, and a digital derotation circuit 317. This circuit tracks any frequency errors and phase drift in the external modulation and demodulation chains. Preferably an additional adaptive loop circuit 319 operates according to the least-mean-square (LMS) algorithm to adaptively estimate demodulation phase noise errors caused by hum and jitter.

Sin θ and cos θ control the deroration circuit 317. They are generated by use of a look-up table stored in a ROM (not shown). The design of trigonometric look-up tables is well known.

The derorator rotates the input data by θ. Given that (I,Q) represents a vector of amplitude $(I^2+Q^2)$, and argument $\tan^{-1}$ (I/Q)=Φ. Thus I=sin Φ and Q=cos Φ, and we require derotated I=I'=sin (Φ+θ) and Q'=cos (Φ+θ).

$$I'=\sin \Phi \cos \theta - \cos \Phi \sin \theta = I \cos \theta - Q \sin \theta;$$

and $$Q'=Q \cos \theta + I \sin \theta.$$

This is implemented in the network of multipliers and adders shown in the derotation circuit 317. The Costas phase error estimation section 315 completes the loop.

The derorator 317 in cooperation with the phase estimation section 315 is also used to correct phase noise and jitter. This jitter is tracked by an LMS adaptive estimate of the phase error. Referring to FIG. 20, the derorated I and Q values, represented as fixed point numbers with a fractional part are sliced in slicers 332, 334 respectively to the nearest legal constellation value. For QPSK this will be +1 or -1. The difference between the derorated value and the sliced value is obtained in subtracters 336, 338, and forms the error. The I and Q error values are converted into a angular error estimate θ error. In the case of QPSK modulation, the θ error is obtained from a switching network contained in angulator 331, according to table 2 below. The output of the angulator 331 is an adapted LMS estimate of the phase jitter or hum error θ estimate. The phase error estimation circuit disclosed in our copending application, Ser. No. 08/481,107, incorporated herein by reference, can also be used, as may many other phase error estimation circuits, for example a circuit embodying the Costas algorithm.

The LMS algorithm and its sign variant is well known, and will not be further explained herein. It is discussed, for example, in *Digital Communication*, Second Edition, by Edward A. Lee and David G. Messerschmitt, Kluwer Academic Publishers, Chap. 11.

The adaptive algorithm has been modified slightly from the standard LMS algorithm in that the θ estimate has been given a leak. Normally leak is zero, but every Nth cycle it is -(sign(θ estimate)). This prevents the θ error from growing beyond operational limits.

Figure 24:
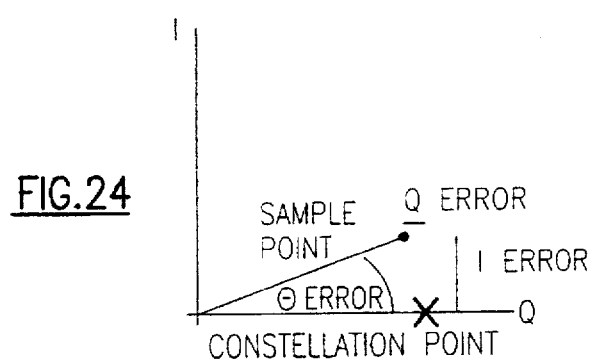
FIG. 24 is a diagram illustrating constellation rotation error.

The Costas loop locks with the constellation points on the axis—i.e., (1, 0), (0, 1), (−1, 0), (0, −1). Thus the error, in the example given, as shown in FIG. 24, may be estimated as θerror=sin$^{-1}$ (Ierror), which approximates to θerror=Ierror.

Similarly for the other constellation points θerror is either + or −Ierror or Qerror as shown in the table below. A geometric representation of θerror is shown in FIG. 24.

TABLE 2

| Approximation of θ error | | |
|---|---|---|
| Constellation | | θ error |
| Q = 1 | I = 0 | Ierror |
| Q = 0 | I = 1 | −Qerror |
| Q = −1 | I = 0 | −Ierror |
| Q = 0 | I = −1 | Qerror |

Error calculation for QAM modulation schemes is more complicated.

As in the case of the timing recovery control loop disclosed hereinabove, the proportional and integral gain constants PI controller 321 in the second order loop 320 start off with wide bandwidth values to minimize acquisition time, and are shifted to a lower bandwidth loop set of values to optimize system bit error rate once lock has been achieved. The values selected can be readily selected in accordance with the requirements of a particular application.

Figure 21:
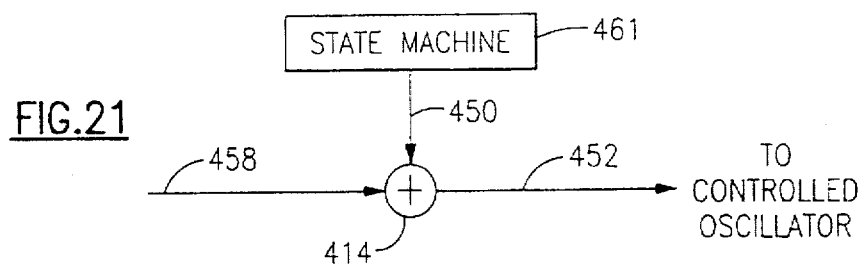
FIG. 21 is an electrical schematic of the hopping adder used in the circuit illustrated in FIG. 19.

After a channel change there may be a significant frequency error which has to be determined before phase can be acquired. It preferable to implement a frequency-lock-loop (i.e., one where the error signal is proportional to the frequency error) or a frequency sweeping acquisition scheme to be able to acquire the initial frequency error. A circuit that achieves a lock is explained with reference to FIG. 21, which is associated with the frequency and phase lock loop circuit 321. Should the proportional integral loop 320 be unable to lock onto the frequency of the received intermediate frequency signal, the circuit of FIG. 21 allows the numerically controlled oscillator 310 to "hop" from one frequency to another at discrete intervals to search for the carrier of the incoming signal. The higher-order bits of the output of the PI controller 321, referenced 458 in FIG. 21, are combined with a hop input 450, taken from a state machine 461, and submitted to the hopping adder 414. The adder 414 outputs a frequency offset signal 452 which is accepted by the numerically controlled oscillator 310.

Second Embodiment

Figure 22:
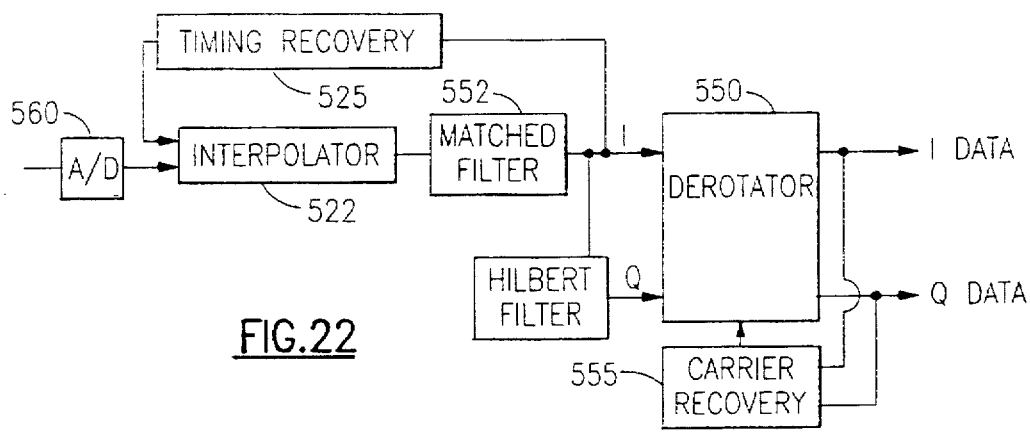
FIG. 22 is a block diagram illustrating a carrier recovery and a timing recovery circuit according to an alternate embodiment of the invention.

Many forms of modulation are known to the art which do not generate both the in phase and quadrature components upon demodulation. For example, vestigial sideband (VSB) modulation is achieved by amplitude modulating a pulsed baseband signal, and suppressing a redundant sideband of the amplitude modulated (AM) signal, in order to conserve bandwidth. Usually the lower sideband is suppressed. In the digital form of VSB, a digital pulse amplitude modulated (PAM) signal is employed. The alternate embodiment of the invention disclosed hereinbelow with reference to FIG. 22 is suitable for the reception of VSB signals, as well as many other modulation schemes. As in the first embodiment, the output of an analog-to-digital converter 560 is applied to a sinc interpolator unit 522, which is followed by a matched filter 552, and a timing recovery circuit 525. The details of these components are the same as for the first embodiment, and need not be repeated. The derotation circuit 550, and the carrier recovery circuit 555 have the same structure as in the first embodiment. However the derorator circuit 550 requires a quadrature input, which must be generated, as it is lacking in the sampled demodulated signal that is output by the analog-to-digital converter 560. It is possible to operate the timing recovery circuit 525 in accordance with the Gardner algorithm with only the in phase component, in which case the error signal given above will be $$\text{error}(r) = I\left[r - \frac{T}{2}\right][I(r) + I(r-T)]$$

where
I is the in phase output;
T is the symbol period; and
r is the sample time of the even sample.

Figure 23:
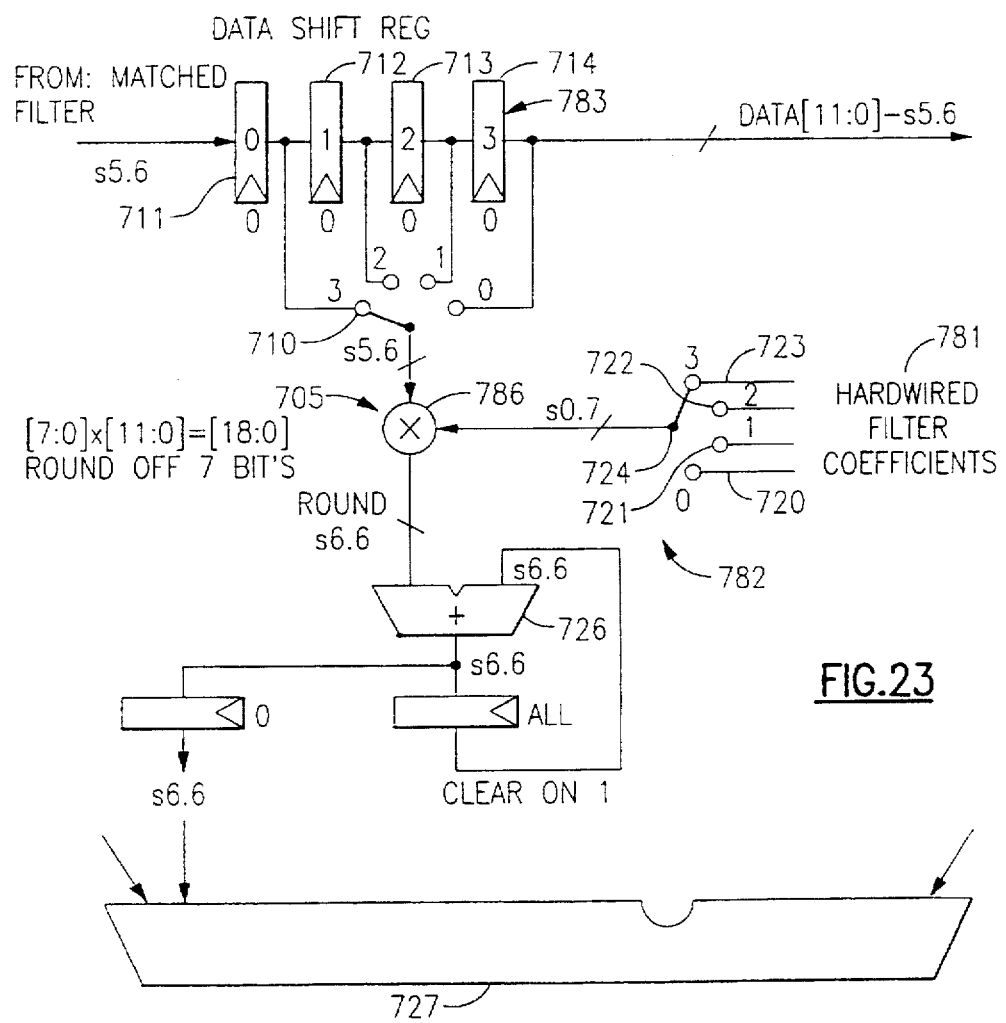
FIG. 23 is a more detailed diagram of a Hilbert filter used in the circuit shown in FIG. 22.

The Q input is developed by a Hilbert filter, shown in FIG. 23. The Hilbert filter has an impulse response and a transfer function given by $$h(t)=1/\pi t \quad H(j,\omega)=-j\text{sgn}(\omega)$$

The Hilbert filter is an eleven tap FIR filter, which has been implemented in much the same way as the FIR filter 290 (FIG. 18). The filter is organized as a plurality of cells operating in series, according to the length of the filter. One cell 782 is illustrated in FIG. 23, it being understood that the other cells are structurally identical. In order to reduce hardware, the multiplier 786 is shared among the coefficients and the taps in a data shift register 783.

The multiplier-accumulator unit 705 of the cell 782 will be described. The data shift register 783 comprises registers 711,712, 713, and 714, and is clocked at T, which by way of example is 133 ns. The outputs from the shift registers 710–713 therefore only change only every 133 ns. The cell 782 could be implemented by associating a multiplier with each of the registers 710–713, for a total of 4 multipliers. However because the multiplier 786 can operate in only 33 ns, T/4 the cell has been designed to have one multiplier 786 which is switched by switch 710 between the four data registers 711–714. Four coefficient registers 720–723 are provided to supply the multiplier 786. Of course it is also required that the coefficient registers 720–723 also be switched, indicated by switch 724 in FIG. 23. The filter structure requires that the cell output be formed according to the equation $$CC_{out} = \sum_{n=0}^{3} D_n C_n$$

where
$CC_{out}$ is the cell output;
$D_n$ is the contents of the nth data shift register; and
$C_n$ is the contents of the nth coefficient register.
$CC_{out}$ is accumulated using the adder 726. The individual outputs $CC_{out}$ of each of the units 705 is latched, and summed in an adder tree 727. As the multiplier requires the largest area of each cell, a large amount of chip area has thus been conserved.

Third Embodiment

Figure 25:
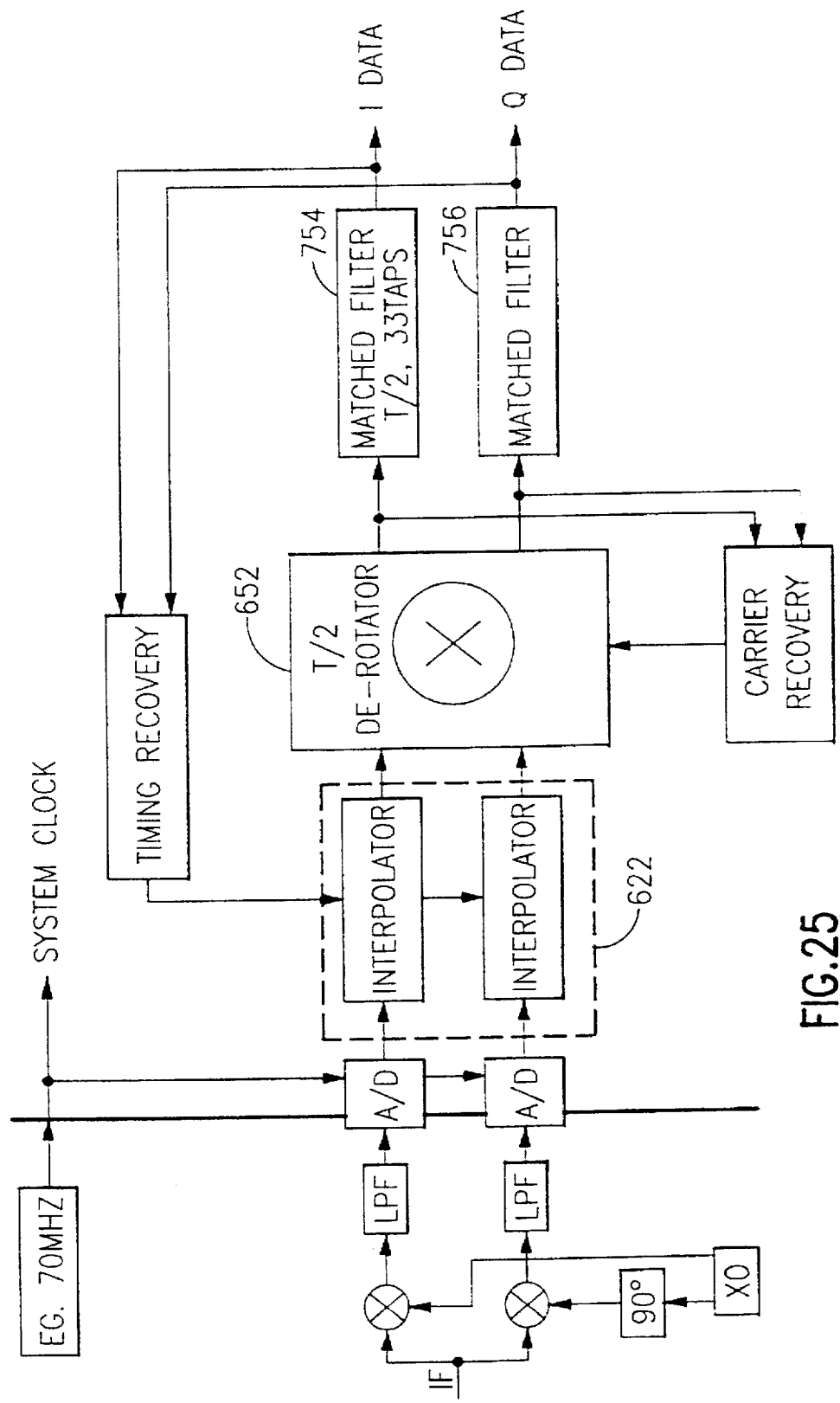
FIG. 25 is a block diagram illustrating a second alternate embodiment of the invention.

A third embodiment of the invention is disclosed herein with reference to FIG. 25. Its construction is similar to the first embodiment. However, having reference to FIG. 10, which has been discussed in connection with the first embodiment, it will be noted that the derotater 150 is disposed following the matched filters 254, 256. This arrangement has the advantage of using relatively inexpensive hardware in the derotator, which can be clocked at T. However the signals applied to the matched filters 254, 256 are affected by constellation rotation and frequency errors, and hence the filtered output will not perfectly restore the source pulses. In FIG. 25 the derotater 652 is disposed intermediate the interpolator 622, and the matched filters 754, 756. The derotater 652 is now required to be clocked at T/2; however the signal produced by the matched filters 754, 756 is a more accurate restoration.

While this invention has been explained with reference to the structure disclosed herein, it is not confined to the details set forth and this application is intended to cover any modifications and changes as may come within the scope of the following claims:

What is claimed is:

1. A signal processing apparatus for processing signals that are sampled by a sampler operative at a sampling rate, the signals having a period corresponding to a received symbol rate, the apparatus comprising:

a clock, operative at said sampling rate;

a numerically controlled oscillator operative at periods T;

an interpolator receiving samples at said sampling rate; and a loop filter, coupled to said interpolator and said numerically controlled oscillator and having an output responsive to a difference between said periods T and said period corresponding to said received symbol rate of said sampled signals;

wherein said numerically controlled oscillator is responsive to said output of said loop filter and generates a first output signal that is representative of an interpolation distance between succeeding samples, and said interpolator interpolates said received samples according to said interpolation distance, and produces an output signal representative of interpolated samples, and said numerically controlled oscillator generates said first output signal whenever a state Ω exceeds a division of said symbol period, and said interpolator generates said output signal representative of interpolated samples in response to said first output signal, wherein Ω is a state representative of a number of elapsed operative periods of said numerically controlled oscillator.

2. The apparatus according to claim 1, wherein an input signal is modulated, and said interpolator is a sinc interpolator, further comprising:

an I,Q demodulator; and a sampler, comprising first and second analog-to-digital converters respectively coupled to an in phase output and a quadrature output of said demodulator; wherein said sinc interpolator accepts in phase and quadrature outputs of said sampler.

3. The apparatus according to claim 1, wherein said loop filter accepts an in phase component of said interpolated samples and an error signal is computed according to the equation:

$$\text{error}(r) = I\left[r - \frac{T}{2}\right][I(r) + I(r-T)]$$

wherein
I is the in phase component;
T is the symbol period; and
r is the interval between alternate samples.

4. The apparatus according to claim 1, wherein said loop filter accepts an in phase component and a quadrature component of said interpolated samples an error signal is computed according to the equation:

$$\text{error}(r) = I\left[r - \frac{T}{2}\right][I(r) + I(r-T)] +$$

$$Q\left[r - \frac{T}{2}\right][Q(r) + Q(r-T)]$$

wherein
I is the in phase component;
Q is the quadrature component;
T is the symbol period; and
r is the interval between alternate samples.

5. The apparatus according to claim 1, wherein said interpolater is a sinc interpolator, said numerically controlled oscillator, said sinc interpolator, and said loop filter comprise an integrated semiconductor circuit.

6. The apparatus according to claim 5, wherein said integrated semiconductor circuit is a CMOS circuit.

7. The apparatus according to claim 1, further comprising a matched filter having an input coupled to said interpolator and an output coupled to said loop filter.

8. The apparatus according to claim 7, wherein said matched filter is a square-root raised cosine filter.

9. The apparatus according to any of claims 1–8, wherein said first output signal of said numerically controlled oscillator further comprises a second output signal that is representative of a value Δ according to the equation:

$$= \text{fraction}\left[\left(\frac{2\Omega MOD1}{2}\right)\left(\frac{\text{system clock}}{\text{baud rate}}\right)\right]$$

wherein:
system clock is said clock rate;
baud rate is said nominal baud rate; and
Ω is said state representative of a number of elapsed operative periods of said numerically controlled oscillator, and said interpolator emits an interpolated sample upon receiving said second output signal.

10. The apparatus according to any of claims 1–7, further comprising an analog-to-digital converter coupled to an input of a sinc interpolator and sampling a signal at said sampling rate.

11. The apparatus according to any of claims 1–7, wherein said interpolator comprises:
a first sinc interpolator that receives an in phase component of said samples; and
a second sinc interpolator that receives a quadrature component of said samples.

12. The apparatus according to any of claims 1–7, wherein said interpolator comprises a finite impulse response filter having a bank of coefficients.

13. The apparatus according to claim 12, wherein said bank of coefficients comprises a plurality of banks, and a sinc interpolator further comprising:
an addressable memory containing a plurality of coefficients.

14. The apparatus according to any claims 1–7, wherein said interpolator is a sinc interpolator and performs a plurality of sinc interpolations that precede and follow a required sinc interpolation point, further comprising:
a linear interpolator that performs linear interpolation on said plurality of sinc interpolations.

15. The apparatus according to any of claims 1–8, wherein said periods T are initially equal to a nominal baud rate divided by said sampling rate.

16. A signal processing apparatus for processing an input signal having a period corresponding to a received symbol rate, the apparatus comprising:
a clock, operative at said sampling rate;
a numerically controlled oscillator operative at periods T;
a sinc interpolator receiving samples at said sampling rate; wherein said interpolator comprises a finite impulse response filter operable according to a bank of coefficients, and an addressable memory having said coefficients memorized therein;
a loop filter, coupled to said sinc interpolator and said numerically controlled oscillator and having an output responsive to a difference between said periods T and said period corresponding to said received symbol rate of said sampled signals;
a sampler, comprising first and second analog-to-digital converters respectively coupled to an in phase component and a quadrature component of said signals; wherein said sinc interpolator and said loop filter accept in phase and quadrature outputs of said sampler;
wherein said numerically controlled oscillator is responsive to said loop filter and generates an output signal that is representative of an interpolation distance between succeeding samples, and said interpolator interpolates said received samples according to said interpolation distance, and produces an output signal representative of said interpolated samples; and said numerically controlled oscillator, said sinc interpolator, and said loop filter comprise an integrated semiconductor circuit, wherein said output of said numerically controlled oscillator comprises a first output signal that is generated whenever said state Ω exceeds a division of said symbol period, and said interpolator generates an output in response to said first output signal, wherein Ω is a state representative of a number of elapsed operative periods of said numerically controlled oscillator.

17. The apparatus according to claim 16, wherein said integrated semiconductor circuit is a CMOS circuit.

18. The apparatus according to claim 16, further comprising a matched filter having an input coupled to said interpolator and an output coupled to said loop filter.

19. The apparatus according to claim 18, wherein said matched filter is a square-root raised cosine filter.

20. The apparatus according to claim 16, wherein said first output signal of said numerically controlled oscillator further comprises a second output signal that is representative of a value Δ according to the equation:

$$= \text{fraction}\left[\left(\frac{2\Omega MOD1}{2}\right)\left(\frac{\text{system clock}}{\text{baud rate}}\right)\right]$$

wherein:
system clock is said clock rate;
baud rate is said nominal baud rate; and
Ω is a state representative of a number of elapsed operative periods of said numerically controlled oscillator, and said interpolator emits an interpolated sample upon receiving said second output signal.

21. The apparatus according to any of claims 16–19, wherein said sinc interpolator comprises:
a first sinc interpolator that receives an in phase component of said samples; and
a second sinc interpolator that receives a quadrature component of said samples.

19

22. The apparatus according to any claims 16–19, wherein said sinc interpolator and performs a plurality of sinc interpolations that precede and follow a required sinc interpolation point, further comprising:
 a linear interpolator that performs linear interpolation on said plurality of sinc interpolations.

23. The apparatus according to any claims 16–19, wherein said sampler is integrated in said integrated circuit.

24. The apparatus according to any of claims 16–19, wherein said periods T are initially equal to a nominal baud rate divided by said sampling rate.

25. A signal processing apparatus for processing signals that are sampled by a sampler operative at a sampling rate, the signals having a period corresponding to a received symbol rate, the apparatus comprising:
 a clock, operative at said sampling rate;
 a numerically controlled oscillator operative at periods T;
 an interpolator receiving samples at said sampling rate; and
 a loop filter, coupled to said interpolator and said numerically controlled oscillator and having an output responsive to a difference between said periods T and said period corresponding to said received symbol rate of said sampled signals, wherein said loop filter accepts an in phase component of said interpolated samples and an error signal is computed according to the equation:

$$\text{error}(r) = I\left[r - \frac{T}{2}\right][I(r) + I(r-T)]$$

wherein
 I is the in phase component;
 T is the symbol period; and
 r is the interval between alternate samples;
 wherein said numerically controlled oscillator is responsive to said output of said loop filter and generated an output signal that is representative of an interpolation distance between succeeding samples, and said interpolator interpolates said received samples according to said interpolation distance, and produces an output signal representative of interpolated samples.

26. A signal processing apparatus for processing signals that are sampled by a sampler operative at a sampling rate, the signals having a period corresponding to a received symbol rate, the apparatus comprising:
 a clock, operative at said sampling rate;
 a numerically controlled oscillator operative at periods T;
 an interpolator receiving samples at said sampling rate; and
 a loop filter, coupled to said interpolator and said numerically controlled oscillator and having an output responsive to a difference between said periods T and said period corresponding to said received symbol rate of said sampled signals;
 wherein said numerically controlled oscillator is responsive to said output of said loop filter and generates an output signal that is representative of an interpolation distance between succeeding samples, and said interpolator interpolates said received samples according to said interpolation distance, and produces an output signal representative of interpolated samples wherein said loop filter accepts an in phase component and a quadrature component of said interpolated samples and said error signal is computed according to the equation:

20

$$\text{error}(r) = I\left[r - \frac{T}{2}\right][I(r) + I(r-T)] +$$
$$Q\left[r - \frac{T}{2}\right][Q(r) + Q(r-T)]$$

wherein
 I is the in phase component;
 Q is the quadrature component;
 T is the symbol period; and
 r is the interval between alternate samples.

27. A signal processing apparatus for processing signals that are sampled by a sampler operative at a sampling rate, the signals having a period corresponding to a received symbol rate, the apparatus comprising:
 a clock, operative at said sampling rate;
 a numerically controlled oscillator operative at periods T;
 an interpolator receiving samples at said sampling rate, wherein said interpolator is a sinc interpolator and performs a plurality of sinc interpolations that precede and follow a required sinc interpolation point;
 a linear interpolator that performs linear interpolation on said plurality of sinc interpolations;
 a loop filter, coupled to said interpolator and said numerically controlled oscillator and having an output responsive to a difference between said periods T and said period corresponding to said received symbol rate of said sampled signals;
 wherein said numerically controlled oscillator is responsive to said output of said loop filter and generates an output signal that is representative of an interpolation distance between succeeding samples, and said interpolator interpolates said received samples according to said interpolation distance, and produces an output signal representative of said interpolated samples.

28. The apparatus according to any of claims 25–27, wherein said interpolater is a sinc interpolator, said numerically controlled oscillator, said sinc interpolator, and said loop filter comprise an integrated semiconductor circuit.

29. The apparatus according to any of claims 25–27, further comprising a matched filter having an input coupled to said interpolator and an output coupled to said loop filter.

30. The apparatus according to any of claims 25–27, wherein said matched filter is a square-root raised cosine filter.

31. A signal processing apparatus for processing an input signal having a period corresponding to a received symbol rate, the apparatus comprising:
 a clock, operative at said sampling rate;
 a numerically controlled oscillator operative at periods T;
 a sinc interpolator receiving samples at said sampling rate; wherein said interpolator comprises a finite impulse response filter operable according to a bank of coefficients, and an addressable memory having said coefficients memorized therein, wherein said sinc interpolator and performs a plurality of sinc interpolations that precede and follow a required sinc interpolation point;
 a linear interpolator that performs linear interpolation on said plurality of sinc interpolations;
 a loop filter, coupled to said sinc interpolator and said numerically controlled oscillator and having an output responsive to a difference between said periods T and said period corresponding to said received symbol rate of said sampled signals;

a sampler, comprising first and second analog-to-digital converters respectively coupled to an in phase component and a quadrature component of said signals; wherein said sinc interpolator and said loop filter accept in phase and quadrature outputs of said sampler;

wherein said numerically controlled oscillator is responsive to said loop filter and generates an output signal that is representative of an interpolation distance between succeeding samples, and said interpolator interpolates said received samples according to said interpolation distance, and produces an output signal representative of interpolated samples; and said numerically controlled oscillator, said sinc interpolator, and said loop filter comprise an integrated semiconductor circuit.

* * * * *

UNITED STATES PATENT AND TRADEMARK OFFICE
CERTIFICATE OF CORRECTION

PATENT NO. : 5,724,396
DATED : March 3, 1998
INVENTOR(S) : Claydon et al.

It is certified that error appears in the above-indentified patent and that said Letters Patent is hereby corrected as shown below:

Col. 1, line 39, please delete "$(\Omega_c$" after "cos " and before "t)" and insert - -$(\omega_c$- - in place thereof.

Col. 10, line 30, please delete "Mailer and Mailer" after "the" and before "algorithm" and insert - - Müller and Müller - - in place thereof.

Col. 13, line 67, please delete "=" after "θerror" and before "Ierror." and insert - - $\cong$ - - in place thereof.

Signed and Sealed this

Thirteenth Day of March, 2001

Attest:

NICHOLAS P. GODICI

Attesting Officer        Acting Director of the United States Patent and Trademark Office